US012603531B2

(12) United States Patent
Luzinski et al.

(10) Patent No.: US 12,603,531 B2
(45) Date of Patent: *Apr. 14, 2026

(54) SYSTEMS AND METHODS FOR WIRELESS POWER AND DATA TRANSFER UTILIZING MULTIPLE ANTENNA RECEIVERS

(71) Applicant: NuCurrent, Inc., Chicago, IL (US)

(72) Inventors: Jason Luzinski, Chicago, IL (US);
Alberto Peralta, Chicago, IL (US);
Pavel Shostak, San Diego, CA (US);
Jacob Babcock, Chicago, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,236

(22) Filed: Jun. 14, 2024

(65) Prior Publication Data

US 2024/0421641 A1     Dec. 19, 2024

Related U.S. Application Data

(63) Continuation of application No. 17/902,054, filed on Sep. 2, 2022, now Pat. No. 12,015,283, which is a
(Continued)

(51) Int. Cl.
*H02J 50/80* (2016.01)
*H02J 50/10* (2016.01)
(Continued)

(52) U.S. Cl.
CPC .............. *H02J 50/80* (2016.02); *H02J 50/10* (2016.02); *H04B 5/26* (2024.01); *H04B 5/79* (2024.01)

(58) Field of Classification Search
CPC .. H02J 50/80; H02J 50/10; H02J 50/20; H02J 50/402; H02J 50/50; H02J 50/90;
(Continued)

(56) References Cited

U.S. PATENT DOCUMENTS 9,344,180 B2    5/2016  Stanescu et al.
9,634,736 B2    4/2017  Mukherjee et al.
(Continued)

FOREIGN PATENT DOCUMENTS

CN       102027691 A    4/2011
CN       103270703 A    8/2013
(Continued)

OTHER PUBLICATIONS

EP Application 21736179.9, EP Search Report, dated Dec. 22, 2023, 21 pages.
(Continued)

*Primary Examiner* — Binh C Tat
(74) *Attorney, Agent, or Firm* — Lee Sullivan Shea & Smith LLP

(57) ABSTRACT

A wireless receiver system, configured to receive both electrical data signals and electrical energy, includes a first receiver antenna, configured to receive one or both of the electrical data signals and the electrical energy, and a power conditioning system in electrical connection with the first receiver antenna, configured to receive electrical energy from the first receiver antenna. The wireless receiver system further includes a second receiver antenna configured to receive the electrical data signals and a receiver controller operatively associated with the first receiver antenna and the second receiver antenna and configured to determine switching instructions. The wireless receiver system further includes a switch operatively associated with the receiver controller and configured to switch receiving operations between the first and second receiver antennas based, at least in part, on the switching instructions.

20 Claims, 12 Drawing Sheets

Related U.S. Application Data continuation of application No. 16/733,524, filed on Jan. 3, 2020, now Pat. No. 11,437,867.

(51) Int. Cl.
*H04B 5/26* (2024.01)
*H04B 5/72* (2024.01)
*H04B 5/79* (2024.01)

(58) Field of Classification Search
CPC .......... H02J 50/23; H02J 50/001; H02J 50/40; H02J 50/27; H02J 50/00; H02J 50/12; H02J 50/60; H02J 50/70; H02J 50/005; H04B 5/26; H04B 5/72; H04B 5/79; H04B 5/263; H04B 13/005; H04B 5/48; B60L 55/00
See application file for complete search history.

(56) References Cited

U.S. PATENT DOCUMENTS

| | | | |
|---|---|---|---|
| 9,876,536 B1 * | 1/2018 | Bell | H02J 50/00 |
| 10,218,207 B2 | 2/2019 | Hosseini et al. | |
| 10,291,055 B1 * | 5/2019 | Bell | H02J 50/20 |
| 10,587,330 B2 | 3/2020 | Hoshi et al. | |
| 10,812,199 B1 | 10/2020 | Kerselaers et al. | |
| 11,133,717 B2 | 9/2021 | Reynolds et al. | |
| 11,133,903 B2 | 9/2021 | Moshfeghi | |
| 11,437,867 B2 * | 9/2022 | Luzinski | H04B 5/263 |
| 12,015,283 B2 * | 6/2024 | Luzinski | H02J 50/10 |
| 2009/0096413 A1 | 4/2009 | Partovi et al. | |
| 2012/0087431 A1 | 4/2012 | Liu et al. | |
| 2013/0009836 A1 | 1/2013 | Islam | |
| 2013/0113422 A1 | 5/2013 | Lee et al. | |
| 2013/0308554 A1 | 11/2013 | Ngai et al. | |
| 2015/0054455 A1 | 2/2015 | Kim et al. | |
| 2015/0145742 A1 | 5/2015 | Cao | |
| 2015/0236517 A1 | 8/2015 | Deguchi et al. | |
| 2015/0357829 A1 | 12/2015 | Makita | |
| 2016/0006290 A1 | 1/2016 | Ho et al. | |
| 2016/0036118 A1 | 2/2016 | Baringer et al. | |
| 2016/0099756 A1 * | 4/2016 | Leabman | H02J 7/00045 307/104 |
| 2016/0126639 A1 | 5/2016 | Kim et al. | |
| 2016/0191121 A1 * | 6/2016 | Bell | H04B 5/79 307/104 |
| 2016/0315670 A1 | 10/2016 | Mukherjee et al. | |
| 2017/0040107 A1 | 2/2017 | Peralta et al. | |
| 2017/0054213 A1 | 2/2017 | Singh et al. | |
| 2017/0077734 A1 | 3/2017 | Nokkonen et al. | |
| 2017/0098963 A1 | 4/2017 | Takahashi et al. | |
| 2017/0288736 A1 | 10/2017 | Zhou et al. | |
| 2017/0338698 A1 | 11/2017 | Zeine et al. | |
| 2018/0212475 A1 | 7/2018 | Noh et al. | |
| 2018/0219426 A1 | 8/2018 | Zeine et al. | |
| 2018/0301790 A1 | 10/2018 | Kim et al. | |
| 2018/0309314 A1 | 10/2018 | White, II et al. | |
| 2019/0109498 A1 | 4/2019 | Stingu et al. | |
| 2019/0280532 A1 | 9/2019 | Matsuo et al. | |
| 2020/0001094 A1 | 1/2020 | Iyer et al. | |
| 2020/0036212 A1 | 1/2020 | Choi et al. | |
| 2020/0153117 A1 | 5/2020 | Papio-Toda et al. | |
| 2020/0227935 A1 | 7/2020 | Mehta et al. | |
| 2020/0235614 A1 | 7/2020 | Swan et al. | |
| 2020/0328621 A1 | 10/2020 | Zeine et al. | |
| 2020/0328630 A1 | 10/2020 | Chen et al. | |
| 2020/0335274 A1 | 10/2020 | Lu et al. | |
| 2020/0350940 A1 | 11/2020 | Backes et al. | |
| 2020/0394486 A1 | 12/2020 | Rizzo | |
| 2021/0091602 A1 | 3/2021 | Woo | |
| 2021/0297199 A1 | 9/2021 | Miao | |
| 2021/0298048 A1 | 9/2021 | Sosnin et al. | |

FOREIGN PATENT DOCUMENTS

| | | |
|---|---|---|
| CN | 106575873 A | 4/2017 |
| CN | 106575970 A | 4/2017 |
| CN | 108028125 A | 5/2018 |
| EP | 3332698 B1 | 8/2023 |
| KR | 20150028042 A | 3/2015 |
| WO | 2008137996 A1 | 11/2008 |
| WO | 2019151693 A1 | 8/2019 |
| WO | 2019208843 A1 | 10/2019 |

OTHER PUBLICATIONS

PCT/US2021/012116 International Search Report and Written Opinion dated Apr. 23, 2021, 10 pages.
Chung, Ming-An, "A Dual-Mode Antenna for Wireless Charging and Near Field Communication", 2015 IEEE International Symposium on Antennas and Propagation and USNC/URSI National Radio Science Meeting, IEEE, 2015, pp. 1288-1289.
IN Application No. 202247043194, First Examination Report, dated Aug. 28, 2025, 7 pages.

* cited by examiner 21, 31, 131

97

95

99

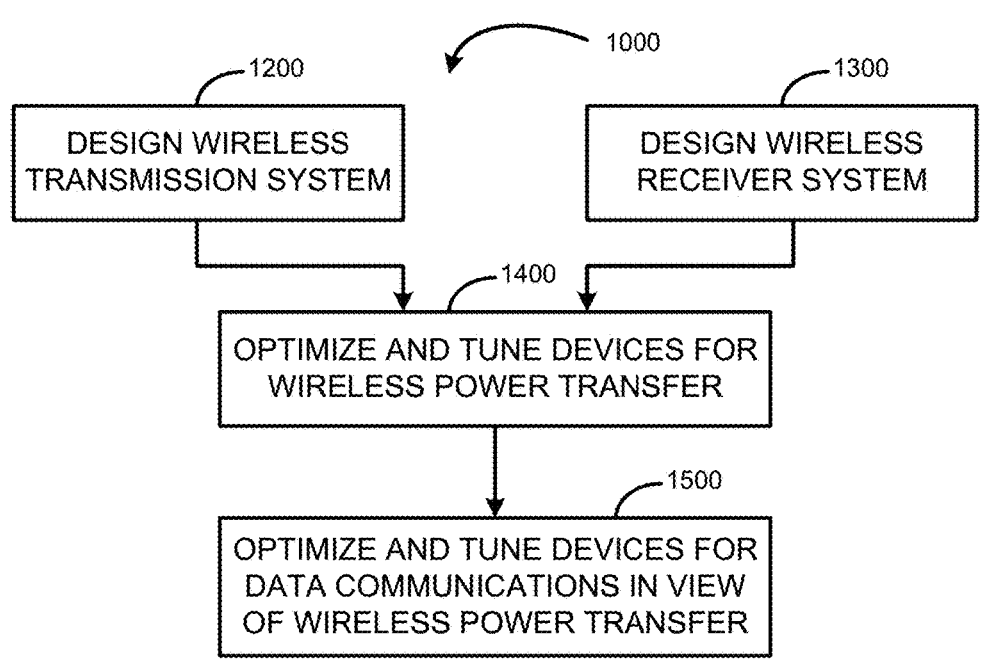
FIG. 11
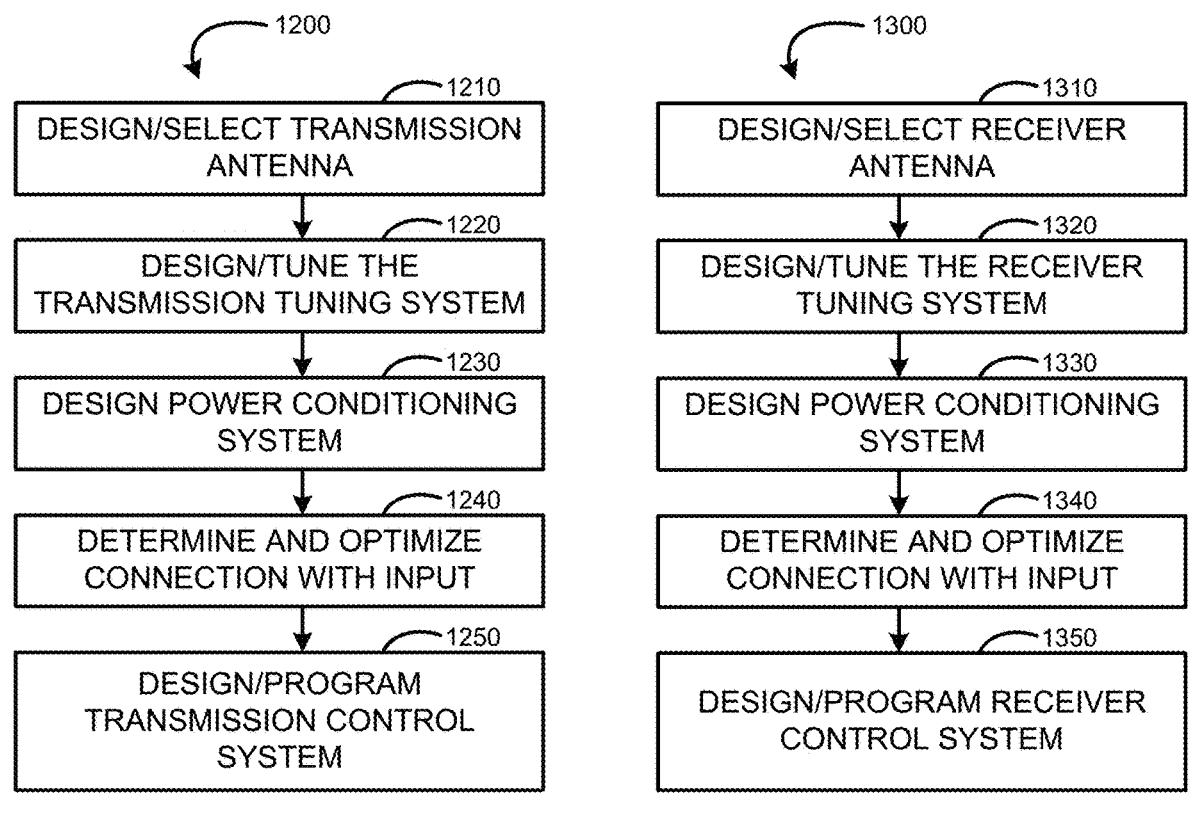
FIG. 12          FIG. 13

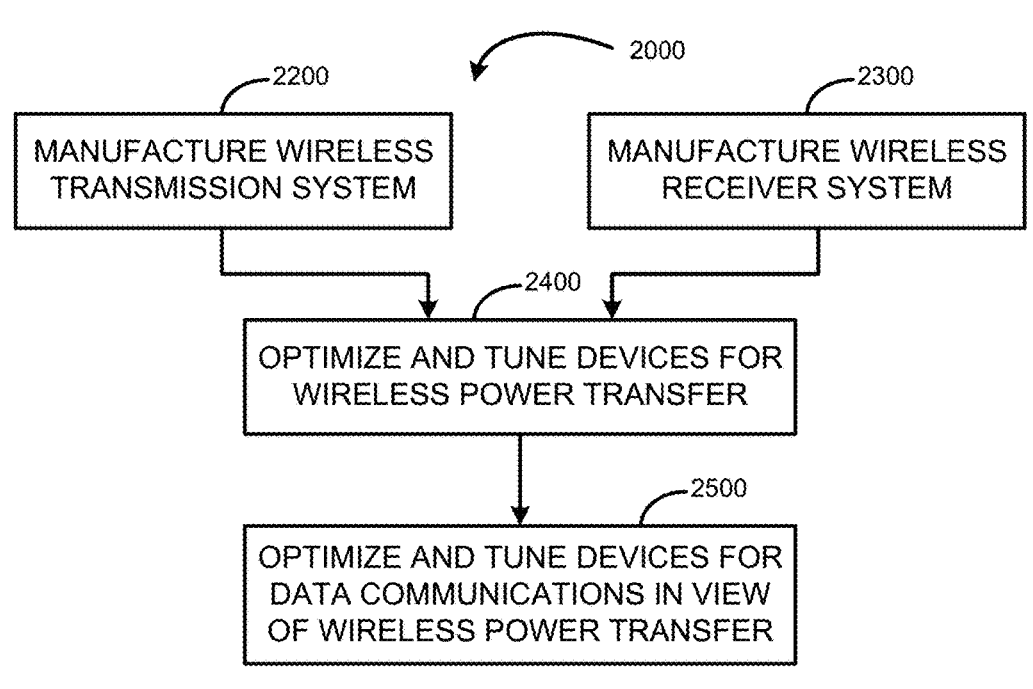
FIG. 14
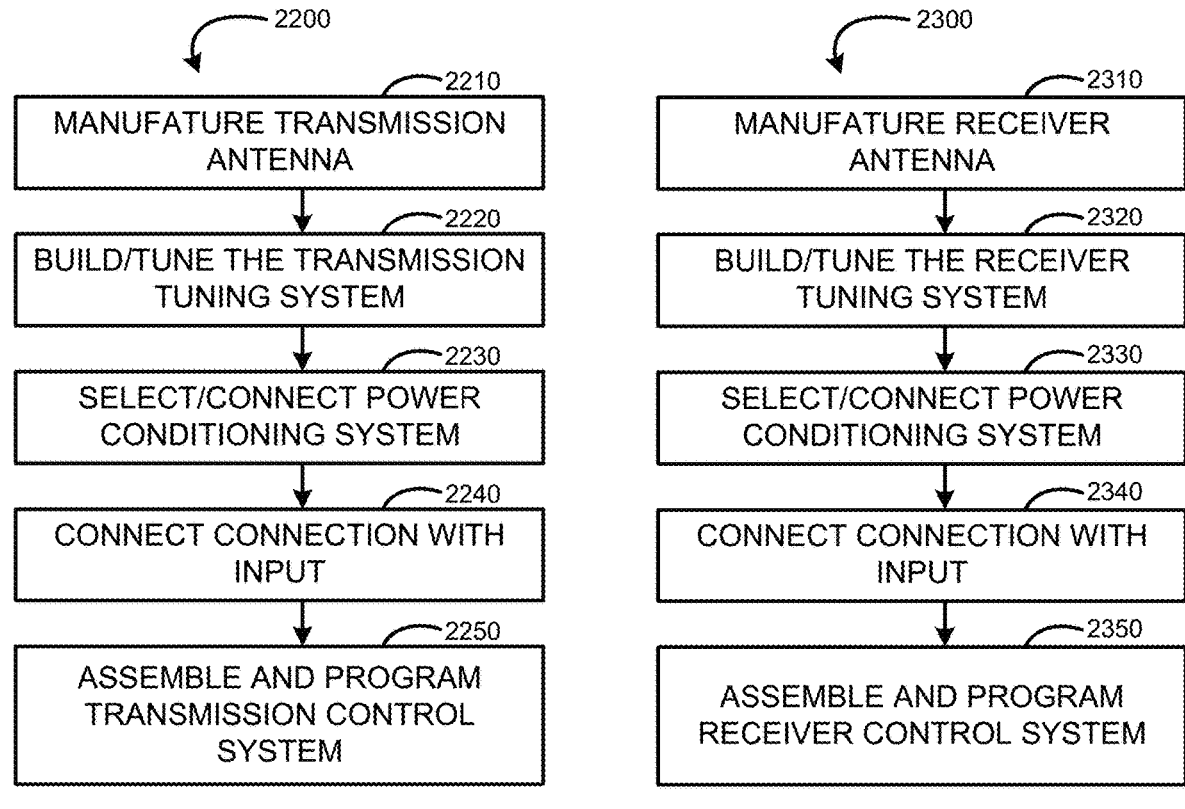
FIG. 15          FIG. 16

SYSTEMS AND METHODS FOR WIRELESS POWER AND DATA TRANSFER UTILIZING MULTIPLE ANTENNA RECEIVERS

CROSS-REFERENCE TO RELATED APPLICATIONS

This application is a continuation of, and claims priority to, U.S. Non-Provisional application Ser. No. 17/902,054, filed on Sep. 2, 2022, and entitled "SYSTEMS AND METHODS FOR WIRELESS POWER AND DATA TRANSFER USTILIZING MULTIPLE ANTENNA RECEIVERS, which, in turn, is a continuation of, and claims priority to, U.S. Non-Provisional application Ser. No. 16/733,524, filed on Jan. 3, 2020, and entitled "SYSTEMS AND METHODS FOR WIRELESS POWER AND DATA TRANSFER UTILIZING MULTIPLE ANTENNA RECEIVERS," each of which is incorporated herein by reference in its entirety.

TECHNICAL FIELD

The present disclosure generally relates to systems and methods for wireless transfer of electrical power and/or electrical data signals, and, more particularly, to systems and methods for wireless power and data transfer that utilize multiple antennas on the receiver side.

BACKGROUND

Wireless connection systems are used in a variety of applications for the wireless transfer of electrical energy, electrical power, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmission and receiver elements will often take the form of coiled wires and/or antennas.

Transmission of one or more of electrical energy, electrical power, electromagnetic energy and electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics, bill of materials (BOM) and/or form factor constraints, among other things. It is to be noted that, "self-resonating frequency," as known to those having skill in the art, generally refers to the resonant frequency of an inductor due to the parasitic characteristics of the component.

In systems wherein wireless data signals and wireless power signals both occur, there are constraints on antenna design, due to antennas preferably having a lower quality factor (Q) for transmitting data versus a higher Q for transferring electrical power. Additionally or alternatively, in some systems, if a power signal is transmitted at a common operating frequency as a data signal, then legacy data antennas without the durability to receive increased power of a power signal may be susceptible to damage, if in operation when a power transmitter is present.

SUMMARY

In view of the above, new wireless transmission systems for transmission of one or more of electrical energy, electrical power, electromagnetic energy and electrical data, are desired, wherein separate, intelligently switched antennas are utilized at the receiver for, respectively, receiving wireless data signals and wireless electrical power signals and/or electrical energy.

In accordance with one aspect of the disclosure, a wireless receiver system, configured to receive electrical data signals and electrical energy, is disclosed. The wireless receiver system includes a first receiver antenna, configured to receive one or both of the electrical data signals and the electrical energy, and a power conditioning system in electrical connection with the first receiver antenna and configured to receive electrical energy from the first receiver antenna. The wireless receiver system further includes a second receiver antenna configured to receive the electrical data signals and a receiver controller operatively associated with the first receiver antenna and the second receiver antenna and configured to determine switching instructions. The wireless receiver system further includes a switch operatively associated with the receiver controller and configured to switch receiving operations between the first and second receiver antennas based, at least in part, on the switching instructions.

In a refinement, the switching instructions are based, at least in part, on the electrical data signals.

In a further refinement, the switching instructions are based, at least in part, on an identifying data packet of the electrical data signals.

In yet a further refinement, the identifying data packet indicates if a wireless transmission system, from which the electronic data signals are transmitted, intends to transmit one or both of the electronic data signals and the electrical energy.

In yet a further refinement, if the data packet indicates that the wireless transmission system intends to transmit electrical energy, then the switching instructions instruct the switch to make the first receiver antenna operable.

In another refinement, the first receiver antenna has a first quality factor and the second receiver has a second quality factor.

In a further refinement, the first quality factor is configured for receipt of electrical energy.

In another further refinement, the second quality factor is configured for receipt of electronic data signals.

In another further refinement, the first quality factor is greater than the second quality factor.

In another refinement, the switch is a single pole, double throw (SPDT) switch.

In another refinement, the wireless receiver system is operatively associated with a host device and the host device includes, at least, a forward facing surface and a rear facing surface. In such a refinement, the first receiver antenna is positioned proximate to the rear facing surface and the second receiver antenna is positioned proximate to the forward facing surface.

In accordance with another aspect of the disclosure, a wireless connection system is disclosed. The wireless connection system includes a wireless transmission system, configured to transmit electrical data signals and electrical energy, and a wireless receiver system. The wireless receiver system includes a first receiver antenna, configured to receive one or both of the electrical data signals and the electrical energy, and a power conditioning system in electrical connection with the first receiver antenna and configured to receive electrical energy from the first receiver antenna. The wireless receiver system further includes a second receiver antenna configured to receive the electrical data signals and a receiver controller operatively associated with the first receiver antenna and the second receiver antenna and configured to determine switching instructions. The wireless receiver system further includes a switch operatively associated with the receiver controller and configured to switch receiving operations between the first and second receiver antennas based, at least in part, on the switching instructions.

In a refinement, the wireless transmission system includes a transmission controller configured to generate, at least in part, the electrical data signals, the electrical data signals including a data packet, the data packet including operating mode information.

In a further refinement, the receiver controller is configured to receive the electrical data signals and determine the switching instructions based, at least in part, on the operating mode information.

In yet a further refinement, the operating mode information indicates if a wireless transmission system, from which the electronic data signals are transmitted, intends to transmit one or both of the electronic data signals and the electrical energy.

In another refinement, the wireless transmission system includes a transmission antenna configured to transmit one or both of the electrical data signals and electrical energy to the first receiver antenna and transmit the electrical data signals to the second receiver antenna.

In accordance with yet another aspect of the disclosure, a method for receiving electrical data signals and electrical energy is disclosed. The method includes receiving, at least, the electrical data signals, from a wireless transmission system, by one or both of a first receiver antenna and a second receiver antenna. The method further includes receiving, by a receiver controller, the electrical data signals from one or both of the first receiver antenna and the second receiver antenna. The method further includes determining, by the receiver controller, the electrical data signals from one or both of the first receiver antenna and the second receiver antenna and switching receiving operations between the first and second receiver antenna based, at least in part, on the switching instructions.

In a refinement, the method further includes determining, by the receiver controller, operating mode information from a data packet of the electrical data signals. In such a refinement, determining the switching instructions is further based on the operating mode information.

In another refinement, the operating mode information indicates if the wireless transmission system intends to transmit one or both of the electronic data signals and the electrical energy.

In another refinement, switching receiving operations includes making the first receiver antenna operable if operating mode information indicates that the transmission system intends to transmit the electrical energy.

To that end, the systems, methods, and apparatus disclosed herein may allow for optimization of quality factors (Q) in antennas chosen or designed for wireless receiver systems. As the Q needed for data transfer and power transfer will often differ, utilizing at least two antennas with intelligent switching at the receiver system allows for optimized data transfer and optimized power transfer.

Accordingly, the systems, apparatus, and methods disclosed herein allow receiver systems to include lower Q antennas for data transfer and higher Q antennas for wireless power transfer.

Additionally, the systems, apparatus, and methods disclosed herein may allow for proper placement of antennas, in the context of a host device. Whereas it may be advantageous, in the mechanical structure design of an electronic device, to include a power transfer antenna on a rear facing portion of the electronic host device, such placement may be disadvantageous for data transfer.

The systems, apparatus, and methods disclosed herein may be particularly useful in wireless power transfer systems wherein fidelity in communications and efficiency in power transfer are both optimized. By including two antennas, each antenna can be optimized for its respective signal transfer characteristics, which may include tuning the quality factor to optimize for one or both of wireless power transfer and data communications.

These and other aspects and features of the present disclosure will be better understood when read in conjunction with the accompanying drawings.

BRIEF DESCRIPTION OF THE DRAWINGS

FIG. 11 is a flow chart for an exemplary method for designing a system for wireless transmission of one or more of electrical energy, electrical power, electromagnetic energy, electronic data, and combinations thereof, in accordance with FIGS. 1-10 and the present disclosure.

FIG. 12 is a flow chart for an exemplary method for designing a wireless transmission system for the system of FIGS. 11, in accordance with FIGS. 1-10, and the present disclosure.

FIG. 13 is a flow chart for an exemplary method for designing a wireless receiver system for the system of FIGS. 11, in accordance with FIGS. 1-10 and the present disclosure.

FIG. 14 is a flow chart for an exemplary method for manufacturing a system for wireless transmission of one or more of electrical energy, electrical power, electrical electromagnetic energy, electronic data, and combinations thereof, in accordance with FIGS. 1-10 and the present disclosure.

FIG. 15 is a flow chart for an exemplary method for designing a wireless transmission system for the system of FIG. 14, in accordance with FIGS. 1-10 and the present disclosure.

FIG. 16 is a flow chart for an exemplary method for designing a wireless receiver system for the system of FIG. 14, in accordance with FIGS. 1-10 and the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
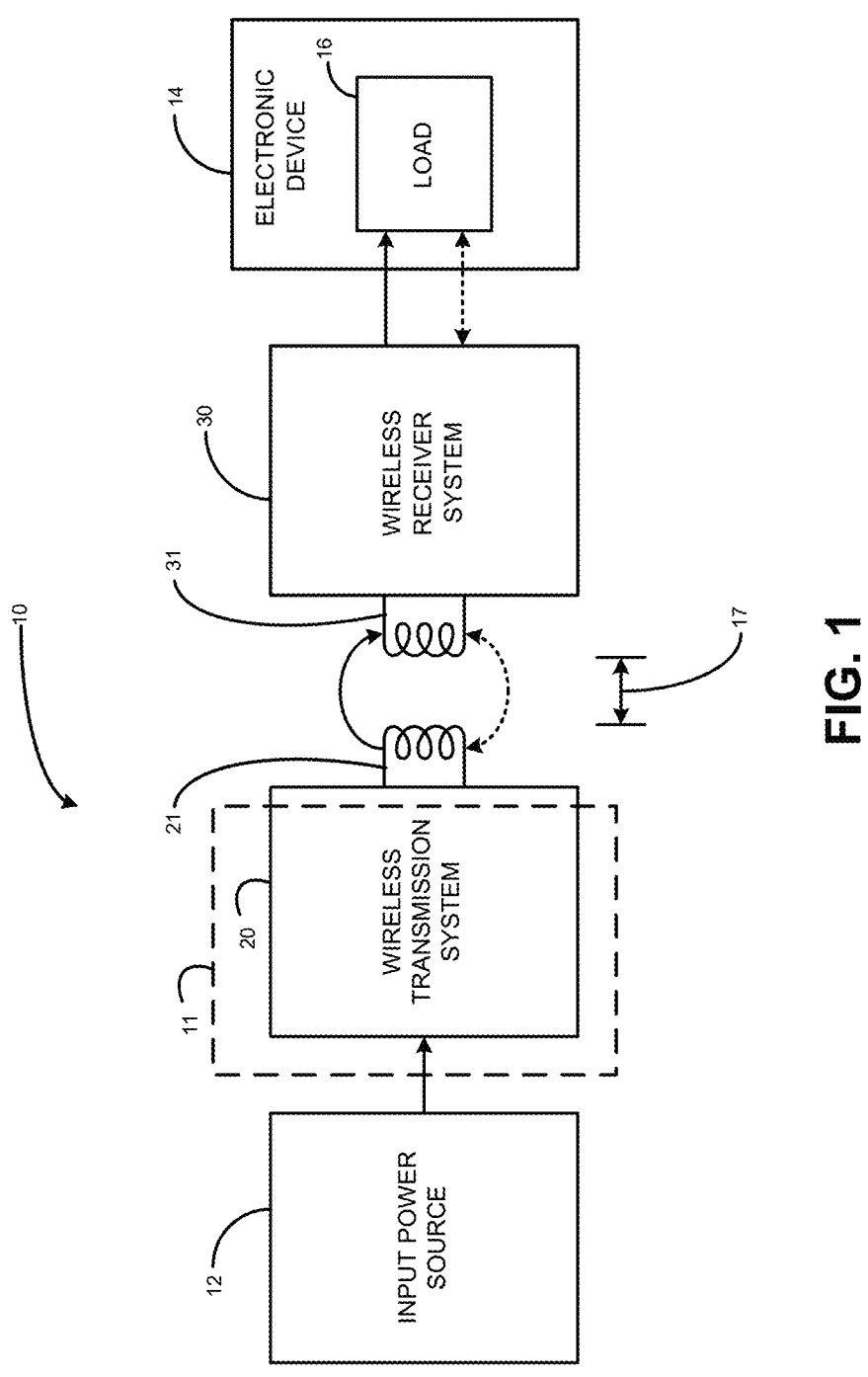
FIG. 1 is a block diagram of an embodiment of a system for wirelessly transferring one or more of electrical energy, electrical power, electromagnetic energy electronic data, and combinations thereof, in accordance with the present disclosure.

Referring now to the drawings and with specific reference to FIG. 1, a wireless electrical connection system 10 is illustrated. The wireless electrical connection system 10 provides for the wireless transmission of electrical signals, such as, but not limited to, electrical energy, electrical power, electromagnetic energy, and electronically transmittable data ("electronic data"). To that end, electrical data signals may be electrical data sent at a data rate, whereas one or more of electrical energy, electrical power, and/or electromagnetic energy may be referring to transmission of electrical voltage or current ranges. Specifically, the wireless electrical connection system 10 provides for the wireless transmission of electrical signals via near field magnetic coupling. As shown in the embodiment of FIG. 1, the wireless electrical connection system 10 includes a wireless transmission system 20 and a wireless receiver system 30. The wireless receiver system is configured to receive electrical energy, electrical power, electromagnetic energy, and/or electronic data from, at least, the wireless transmission system 20.

As illustrated, the wireless transmission system 20 and wireless receiver system 30 may be configured to transmit electrical energy, electrical power, electromagnetic energy, and/or electronically transmittable data across, at least, a separation distance or gap 17. Thus, the combination of the wireless transmission system 20 and the wireless receiver system 30 create an electrical connection without the need for a physical connection. "Electrical connection," as defined herein, refers to any facilitation of a transfer of an electrical current, voltage, and/or power from a first location, device, component, and/or source to a second location, device, component, and/or destination. To that end, an "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless electrical connection, such as, but not limited to, magnetic, electromagnetic, resonant, and/or inductive field, among other wireless electrical connections, connecting a first location, device, component, and/or source to a second location, device, component, and/or destination.

Alternatively, the gap 17 may be referenced as a "Z-Distance," because, if one considers an antenna 21, 31 to be disposed substantially along a common X-Y plane, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

To that end, the wireless power system 10 operates when the wireless transmission system 20 and the wireless receiver system 30 are coupled. As defined herein, the terms "couples," "coupled," and "coupling" generally refers to magnetic field coupling, which occurs when the energy of a transmitter and/or any components thereof and the energy of a receiver and/or any components thereof are coupled to each other through a magnetic field. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, the wireless transmission system 20 may be associated with a host device 11, which may receive power from an input power source 12. The host device 11 may be any electrically operated device, circuit board, electronic assembly, dedicated charging device, or any other contemplated electronic device. Example host devices 11, with which the wireless transmission system 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 20 and the host device 11 are operatively associated with an input power source 12. The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB or mp3 ports and/or adaptors, among other contemplated electrical components).

Electrical energy received by the wireless transmission system 20 is then used for at least two purposes: providing electrical power to internal components of the wireless transmission system 20 and providing electrical power to the transmitter antenna 21. The transmitter antenna 21 is configured to wirelessly transmit the electrical signals conditioned and modified for wireless transmission by the wireless transmission system 20 via near-field magnetic coupling (NFMC). Near-field magnetic coupling enables the transfer of electrical energy, electrical power, electromagnetic energy, and/or electronically transmissible data wirelessly through magnetic induction between the transmitter antenna 21 and a receiving antenna 31 of, or associated with, the wireless receiver system 30. Accordingly, near-field magnetic coupling may enable "inductive coupling," which, as defined herein, is a wireless power transmission technique that utilizes an alternating electromagnetic field to transfer electrical energy between two antennas. Accordingly, such inductive coupling is the near field wireless transmission of electrical energy between two magnetically coupled coils that are tuned to resonate at a similar frequency. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmitter antenna 21 or the receiver antenna 31 are strategically positioned to facilitate reception and/or transmission of wirelessly transferred electrical energy, power, electromagnetic energy and/or data through near field magnetic induction. Antenna operating frequencies may comprise all operating frequency ranges, examples of which may include, but are not limited to, about 110 kHz to about 205 kHz (Qi interface standard), 100 kHz to about 350 kHz (PMA interface standard), 6.78 MHz (Rezence interface standard and/or any other proprietary interface standard operating at a frequency of 6.78 MHz), 13.56 MHz (Near Field Communications (NFC) standard, defined by ISO/IEC standard 18092), 27 MHz and/or, alternatively, at an operating frequency of another proprietary operating mode. To that end, the operating frequencies of the antennas 21, 31 may be operating frequencies designated by the International Telecommunications Union (ITU) in the Industrial, Scientific, and Medical (ISM) frequency bands, which include, but is not limited to including, 6.78 MHz, 13.56 MHz, and 27 MHz, which are designated for use in wireless power transfer. In addition, the transmitting antenna and/or the receiving antenna of the present disclosure may be designed to transmit or receive, respectively, over a wide range of operating frequencies on the order of about 1 kHz to about 1 GHz or greater, in addition to the Qi, PMA, Rezence, and NFC interface standards. In addition, the transmitting antenna and the receiving antenna of the present disclosure may be configured to transmit and/or receive electrical power having a magnitude that ranges from about 10 mW to about 500 W. In one or more embodiments the inductor coil of the transmitting antenna 21 is configured to resonate at a transmitting antenna resonant frequency or within a transmitting antenna resonant frequency band. In one or more embodiments the transmitting antenna resonant frequency is at least 1 kHz. As known to those skilled in the art, a "resonant frequency" or "resonant frequency band" refers a frequency or frequencies wherein amplitude response of the antenna is at a relative maximum, or, additionally or alternatively, the frequency or frequency band where the magnitude of the capacitive reactance is substantially similar to the magnitude of the inductive reactance. In one or more embodiments the transmitting antenna resonant frequency band extends from about 1 kHz to about 100 MHz. In one or more embodiments the inductor coil of the receiving antenna 31 is configured to resonate at a receiving antenna resonant frequency or within a receiving antenna resonant frequency band. In one or more embodiments the receiving antenna resonant frequency is at least 1 kHz. In one or more embodiments the receiving antenna resonant frequency band extends from about 1 kHz to about 100 MHz.

The wireless receiver system 30 may be associated with at least one electronic device 14, wherein the electronic device 14 may be any device that requires electrical power for any function and/or for power storage (e.g., via a battery and/or capacitor). Additionally or alternatively, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless electrical connection, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30. While the systems and methods herein illustrate the transmission of wirelessly transmitted energy, wirelessly transmitted power, wirelessly transmitted electromagnetic energy, and electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 2:
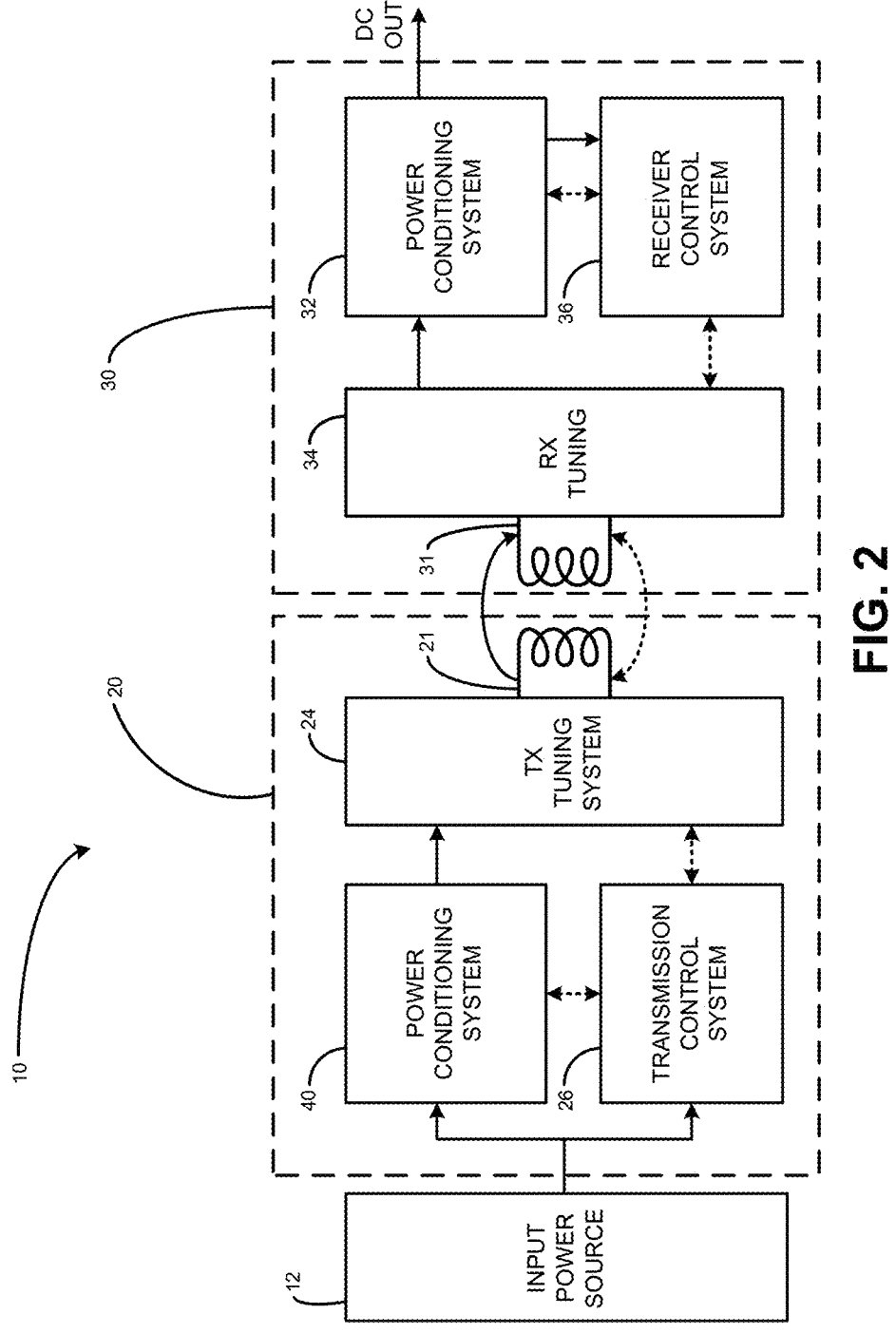
FIG. 2 is a block diagram illustrating components of a wireless transmission system of the system of FIG. 1 and a wireless receiver system of the system of FIG. 1, in accordance with FIG. 1 and the present disclosure.

Turning now to FIG. 2, the wireless connection system 10 is illustrated as a block diagram including example subsystems of both the wireless transmission system 20 and the wireless receiver system 30. As illustrated, the wireless transmission system 20 may include, at least, a power conditioning system 40, a transmission control system 26, a transmission tuning system 24, and the transmission antenna 21. As illustrated, a first portion of the electrical energy input from the input power source 12 is configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

Figure 3:
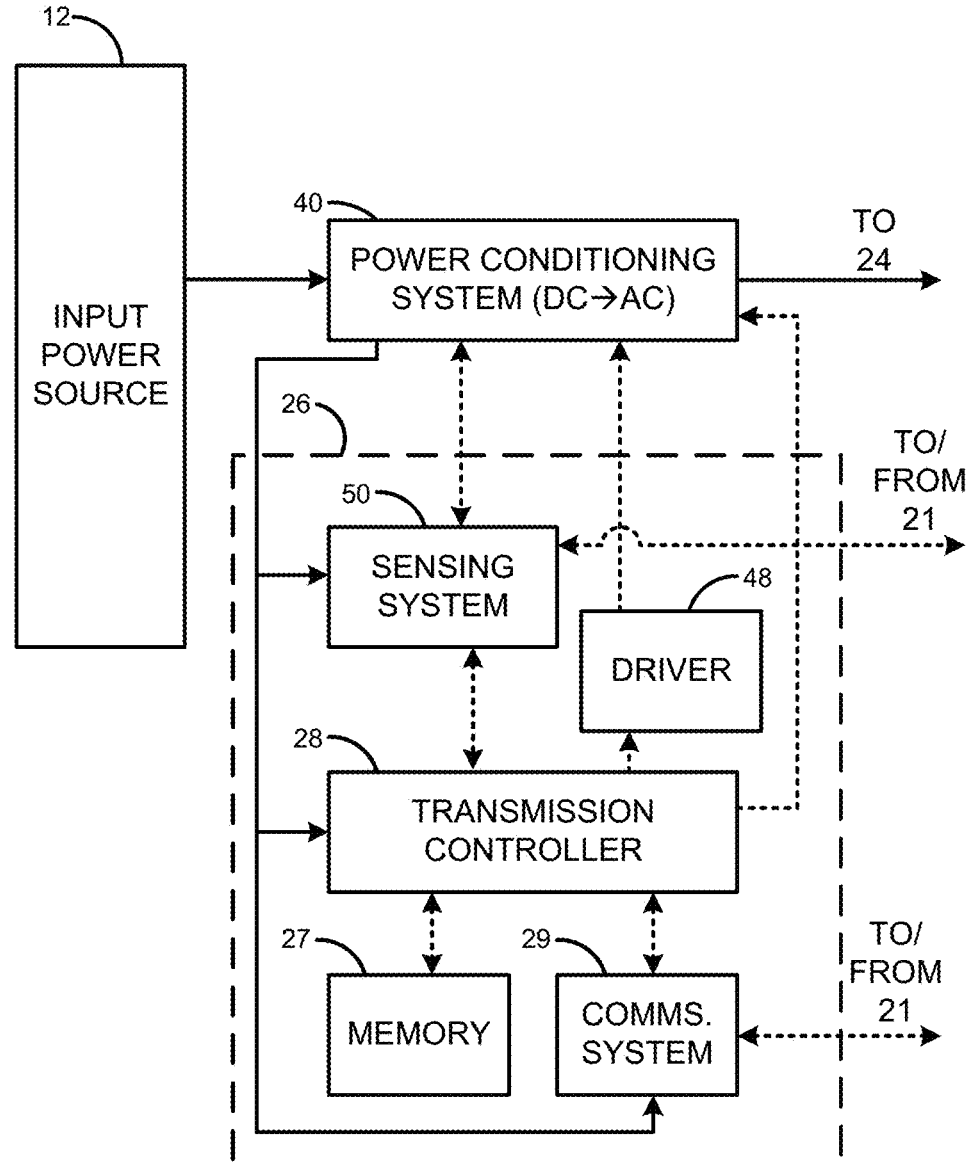
FIG. 3 is a block diagram illustrating components of a transmission control system of the wireless transmission system of FIG. 2, in accordance with FIG. 1, FIG. 2, and the present disclosure.

Referring now to FIG. 3, with continued reference to FIGS. 1 and 2, subcomponents and/or systems of the transmission control system 26 are illustrated. The transmission control system 26 may include, but is not limited to, including a sensing system 50, a transmission controller 28, a communications system 29, a driver 48, and a memory 27. The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

Further, while particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 4:
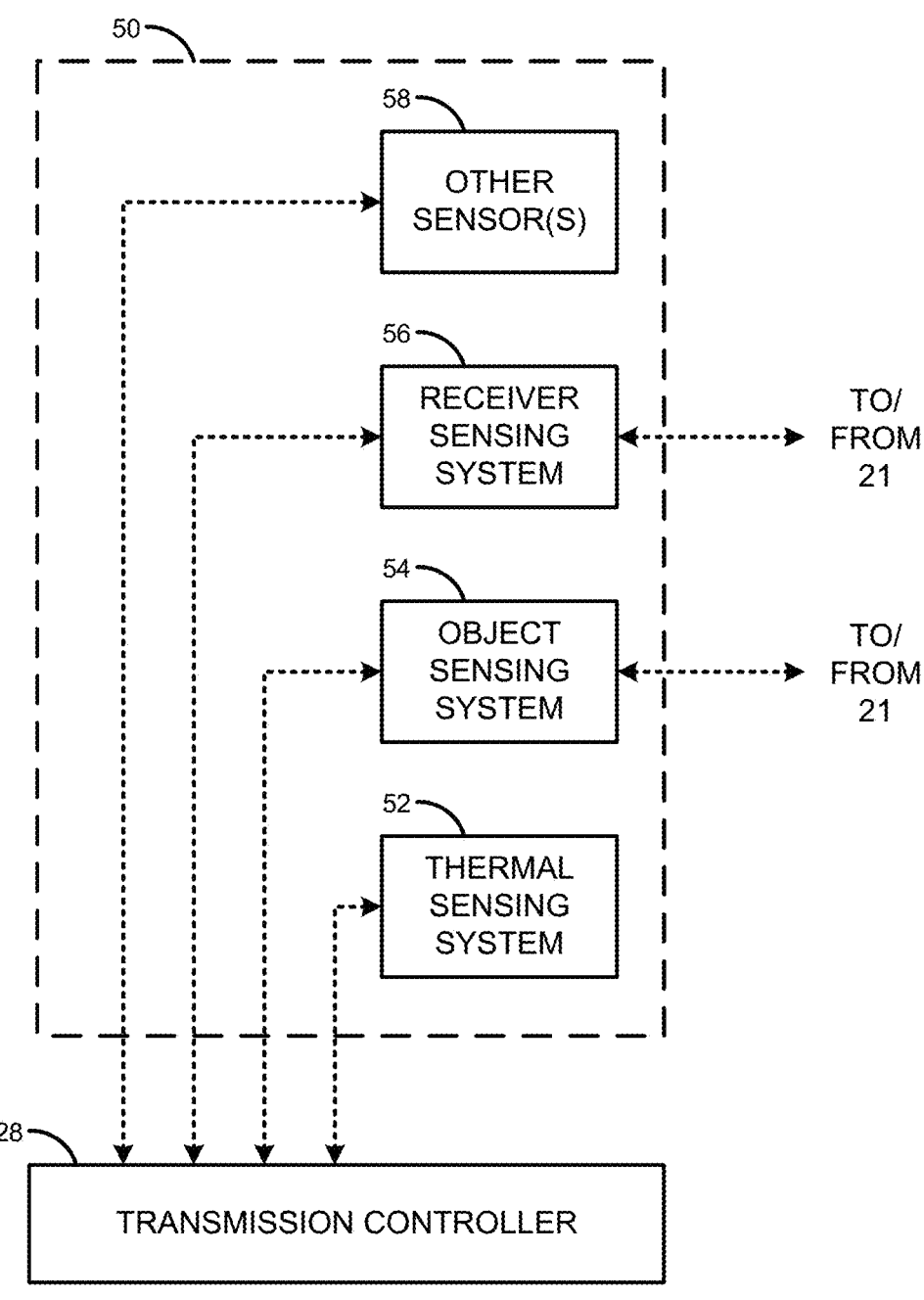
FIG. 4 is a block diagram illustrating components of a sensing system of the transmission control system of FIG. 3, in accordance with FIGS. 1-3 and the present disclosure.

As illustrated in the embodiment of FIG. 4, the sensing system 50 may include, but is not limited to including, a thermal sensing system 52, an object sensing system 54, a receiver sensing system 56, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may further be a foreign object detection (FOD) system. Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 20° Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values. Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the wireless transmission system 20. In some examples, if the presence of any such wireless receiving system is detected, wireless transmission of electrical energy, electrical power, electromagnetic energy, and/or data by the wireless transmission system 20 to said wireless receiving system is enabled. Further, in some examples, if the presence of a wireless receiver system is not detected, wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 5:
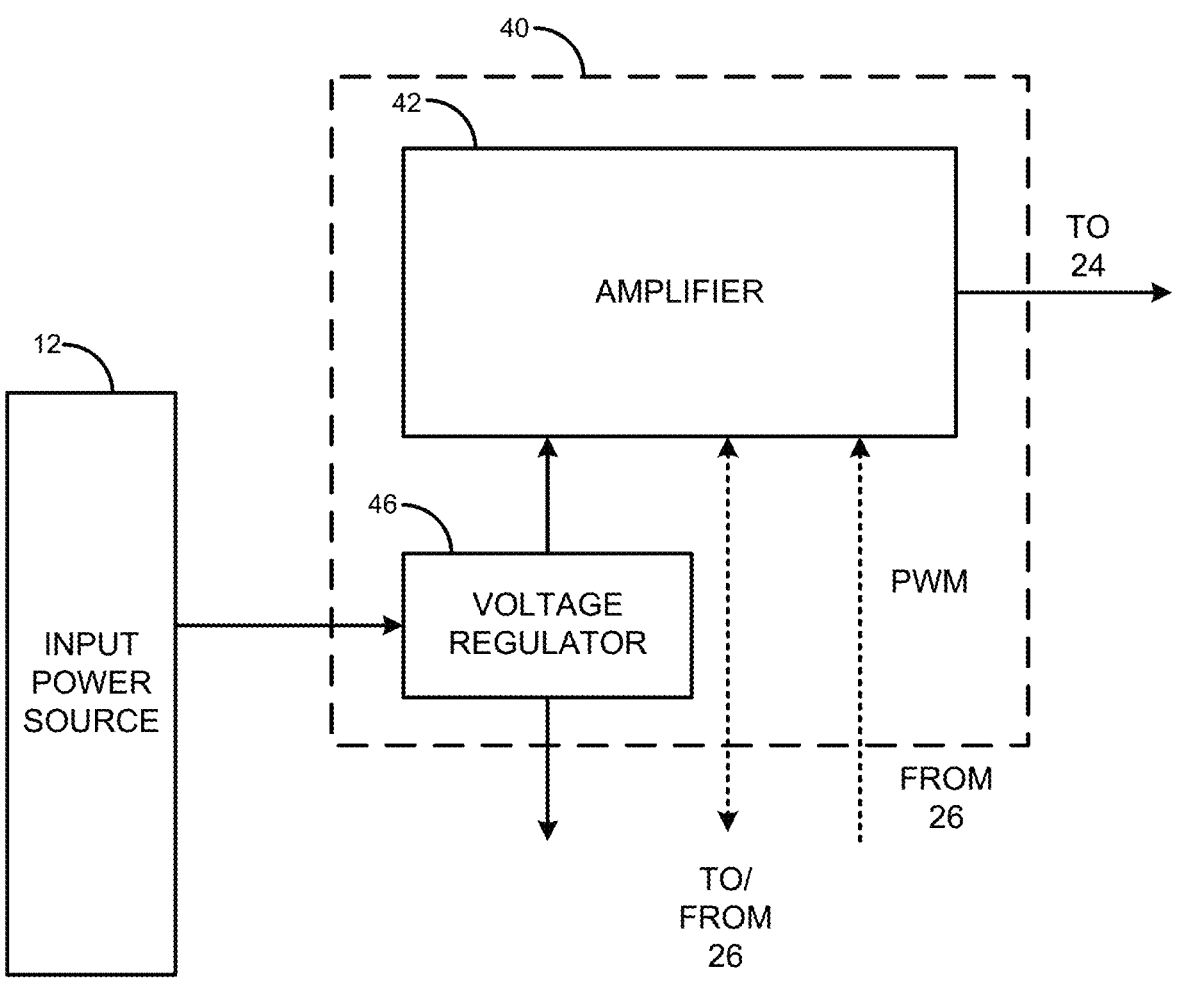
FIG. 5 is a block diagram illustrating components of a power conditioning system of the wireless transmission system of FIG. 2, in accordance with FIG. 1, FIG. 2, and the present disclosure.

Referring now to FIG. 5, and with continued reference to FIGS. 1-4, a block diagram illustrating a first embodiment of the power conditioning system 40 is illustrated. At the power conditioning system 40, electrical power is received, generally, as a direct current (DC) power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 21. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an alternating current (AC) as output, based, at least in part, on PWM input from the transmission control system 26. To that end, the amplifier 42 may be or include, for example, a power stage inverter, such as a dual field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W.

In some non-limiting examples, the amplifier 42 may be or may include one or more class-E power amplifiers. Class-E power amplifiers are efficiently tuned switching power amplifiers designed for use at high frequencies (e.g., frequencies from about 1 MHz to about 1 GHz). Generally, a class-E amplifier employs a single-pole switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, among other amplifiers that could be included as part of the amplifier 42.

Returning now to FIG. 2, the conditioned signal(s) from the power conditioning system 40 is then received by the transmission tuning system 24, prior to transmission by the antenna. The transmission tuning system 24 may include any tuning, impedance matching, filters (e.g. a low pass filter, a high pass filter, a "pi" or "Π" filter, a "T" filter, an "L" filter, a "LL" filter, an L-C trap filter, among other filters), network matching, sensing, and/or conditioning elements configured to optimize wireless transfer of signals from the wireless transmission system 20 to the wireless receiver system 30. For example, the transmission tuning system 24 may include a filter 60, such as the illustrated low pass filter comprised of LF and CF. Further, the transmission tuning system 24 may include an impedance matching circuit, which is designed to match impedance with a corresponding wireless receiver system 30 for given power, current, and/or voltage requirements for wireless transmission of one or more of electrical energy, electrical power, electromagnetic energy, and electronic data.

Figure 6:
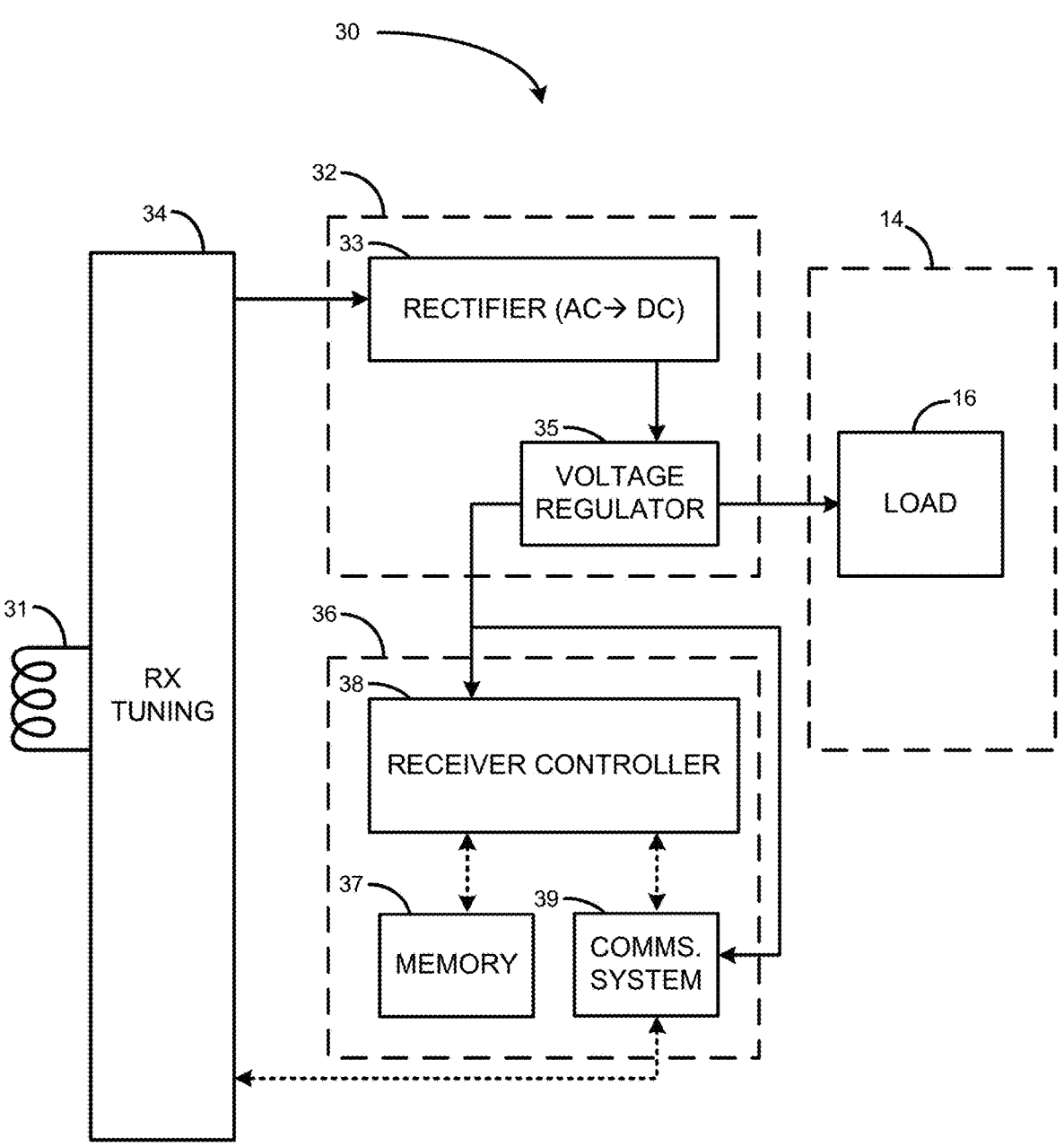
FIG. 6 is a block diagram illustrating components of a receiver control system and a receiver power conditioning system of the wireless receiver system of FIG. 2, in accordance with FIG. 1, FIG. 2, and the present disclosure.

Turning now to FIG. 6 and with continued reference to, at least, FIGS. 1 and 2, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antenna 21. As best illustrated in FIG. 6, the wireless receiver system 30 includes, at least, the receiver antenna 31, a receiver tuning system 34, a power conditioning system 32, and a receiver control system 36. The receiver tuning system 34 may be configured to substantially match the electrical impedance of the wireless transmission system 20. In some examples, the receiver tuning system 34 may be configured to dynamically adjust and substantially match the electrical impedance of the receiver antenna 31 to a characteristic impedance of the power generator or the load at a driving frequency of the transmission antenna 20.

As illustrated, the power conditioning system 32 includes a rectifier 33 and a voltage regulator 35. In some examples, the rectifier 33 is in electrical connection with the receiver tuning system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a controlled rectifier, an uncontrolled rectifier, and a half controlled rectifier. As electronic devices may be sensitive to voltage, additional protection of the electronic device may be provided by clipper circuits or devices. The rectifier 33 may further include a clipper circuit or a clipper device. A clipper is herein defined as a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a shunt linear voltage regulator, a step up switching voltage regulator, a step down switching voltage regulator, an inverter voltage regulator, a Zener controlled transistor series voltage regulator, and an emitter follower voltage regulator. The voltage regulator 35 may further include a voltage multiplier. A voltage multiplier is herein defined as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may be a low dropout linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 and/or other components of the electronic device 14.

The receiver control system 36 may include, but is not limited to, including a receiver controller 38, a communications system 39, and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30, and/or performs any other computing or controlling task desired. The receiver controller 38 may be a single controller or may include more than one controller disposed to control various functions and/or features of the wireless receiver system 30. Functionality of the transmission controller 38 may be implemented in hardware and/or software and may rely on one or more data maps relating to the operation of the wireless receiver system 30. To that end, the receiver controller 38 may be operatively associated with the memory 37. The memory may include one or both of internal memory, external memory, and/or remote memory (e.g., a database and/or server operatively connected to the receiver controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

Further, while particular elements of the receiver control system 36 are illustrated as independent components and/or circuits (e.g., the memory 37, the communications system 39, among other contemplated elements) of the receiver control system 36, such components may be integrated with the receiver controller 38. In some examples, the receiver controller 38 may be and/or include one or more integrated circuits configured to include functional elements of one or both of the receiver controller 38 and the wireless receiver system 30, generally. "Integrated circuits," as defined herein, generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the communications system 39 may be a dedicated circuit configured to send and receive data at a given operating frequency. For example, the communications system 39 may be a tagging or identifier integrated circuit, such as, but not limited to, an NFC tag and/or labelling integrated circuit. Examples of such NFC tag and/or labelling integrated circuits include the NTAG® family of integrated circuits manufactured by NXP Semiconductors N.V. Additionally or alternatively, the communications system 39 may include Bluetooth® communications components, WiFi communications components, TransferJet™ communications components, among other contemplated out of band communications components. However, the communications system 39 is certainly not limited to these example components and, in some examples, the communications system 39 may be implemented with another integrated circuit (e.g., integrated with the receiver controller 38), may be another transceiver of or operatively associated with one or both of the electronic device 14 and the wireless receiver system 30, among other contemplated communication systems and/or apparatus. Further, in some examples, functions of the communications system 39 may be integrated with the receiver controller 39, such that the controller modifies the inductive field between the antennas 21, 31 to communicate in the frequency band of wireless power transfer operating frequency.

Figure 7:
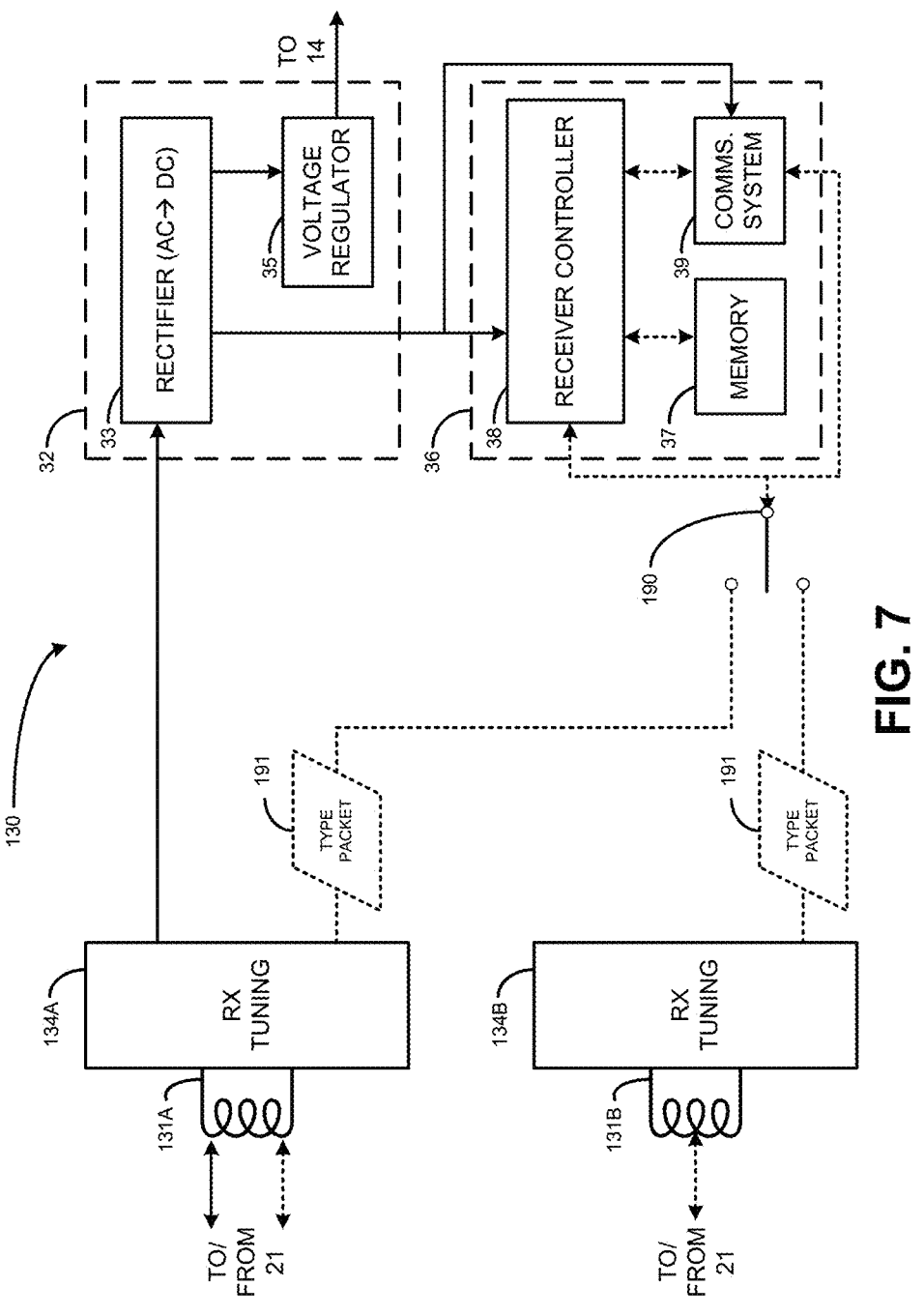
FIG. 7 is a block diagram illustrating another wireless receiver system for use with the system of FIGS. 1-6, in accordance with FIGS. 1-6 and the present disclosure.

Another embodiment of a wireless receiver system 130, for use in the system 10 to wirelessly receive electrical energy and/or electronically transmissible data from the wireless transmission system 20, is illustrated in FIG. 7. As indicated by the reference numbers, the wireless receiver system 130 may include substantially similar, identical, and/or analogous elements to those of FIGS. 1-6, as indicated by common reference numbers. Alternatively, functionally comparable components, which perform one or more similar functions to another, earlier described component, but have distinguishing characteristics, are denoted by three-digit numbers, wherein the most significant digit indicates a "series" for the current embodiment and the two least significant digits correspond to the earlier described component. "Functionally corresponds," as defined herein, means that the two or more components perform a similar function within the context of their respective, broader system, method, or apparatus. For example, in describing the wireless receiver system 130, the most significant digit "1"

indicates the series for the embodiment of FIG. 7 and the two least significant digits, "30," indicate that the wireless receiver system functionally corresponds to the earlier described wireless receiver system 30. To that end, the wireless receiver system 130 functionally corresponds with the wireless receiver system because both of the systems 30, 130 are configured to receive one or both of electrical energy and electronically transmissible data from the wireless transmission system 20.

Similarly to the wireless receiver system 30, the wireless receiver system 130 is configured to receive electrical data signals and electrical energy. To that end, the wireless receiver system 130 includes the power conditioning system 32, including the rectifier 33 and the voltage regulator 35. Further, the wireless receiver system 130 includes the receiver control system 36, which includes the receiver controller 38, the memory 37, and the communications system 39. Additionally, the wireless receiver system 130 includes a first receiver antenna 131A that is in electrical connection with, at least, the power conditioning system 32, via the first receiver tuning system 134A. The first receiver antenna 131A is configured to receive one or both of electrical data signals and electrical energy from the wireless transmission system 20. Additionally, the wireless receiver system 130 includes a second receiver antenna 134B configured to receive electrical data signals. The second receiver antenna 134B is in electrical connection with, at least, the receiver control system 36, via a receiver tuning system 134B.

Additionally, the wireless receiver system 130 includes a switch 190 that is operatively associated with the receiver controller 38, via, in some examples, the communications system 39. The receiver controller 38 is configured to switch receiving operations between the first and second receiver antennas 131A, 131B based, at least in part, on switching instructions. The switching instructions are generated, determined, and/or decoded by the receiver controller 38. In some examples, the switching instructions are based, at least in part, on the electrical data signals received by the receiver controller 38. Such electrical data signals are generated and transmitted by the wireless transmission system 20. In some such examples, the switching instructions are based, at least in part, on an identifying data type packet 191 that is included with and/or is part of the electrical data signals. In some examples, the wireless transmission system 20 and the receiver controller 38 may utilize known protocols for data transfer (e.g., NFC data transfer protocols, bit/byte header protocols, etc.) to indicate a transmission mode. The protocol communication can use known encoding to indicate which can be used by the data type packet 191 to indicate if the receiver is authorized for receipt of electrical energy signals.

Accordingly, the data type packet 191 may include operating mode information for the wireless transmission system 20, wherein the electrical data signals and/or the data type packet 191 may be generated by the transmission controller 28 of the wireless transmission system 20. When the data type packet 191 includes operating mode information, the operating mode information indicates if the wireless transmission system 20 intends to transmit one or both of the electronic data signals and the electrical energy. In such examples, the identifying data type packet 191 and/or associated operating mode information indicates if the wireless transmission system 20 intends to transmit one or both of electronic data signals and electrical energy. In some examples, if the data type packet 191 indicates that the wireless transmission system 20 intends to transmit electrical energy, then the switching instructions instruct the switch to make the first receiver antenna operable.

In some examples, the switch 190 may be a single pole, double throw (SPDT) switch. A SPDT switch, generally, is a switch connecting either of two terminals to a common terminal. In the embodiment of FIG. 7, the switch 190 has two terminals, each connected to a receiver antenna 131A, 131B, that can be selectively connected to a common terminal, which is in communicative or electrical connection with the receiver controller 38. While the switch 190 is illustrated and described as an SPDT switch, other switching components and/or switching systems and methods may be used to embody the switch 190.

In some examples, it may be advantageous to design and/or include two separate antennas in a wireless receiver system, in such a way that will allow one antenna to be optimized for wireless power transfer and another antenna be optimized for wireless data transfer. An important factor in antenna design is the quality factor (Q) of the antenna, which can be defined as:

$$Q = \frac{2\pi f L}{ESR}$$

wherein f is the resonant frequency of the antenna,

L is the inductance of the antenna, and ESR is the equivalent series resistance of the antenna. To that end, Q can also be described as a relationship between frequency bandwidth capabilities of an antenna and the resonant frequency of the antenna, where:

Bandwidth (BW)=*f*/Q.

In wireless power transfer applications, it is advantageous to have a high quality factor, as it directly influences system efficiency. Alternatively, in accordance with the above bandwidth equation, as Q increases, the bandwidth capabilities of the antenna decrease. In designing an antenna for data transfer, it may be advantageous to have a lower Q, as bandwidth directly affects data transfer capabilities, such as speed. At high resonant frequencies (for example, 6.78 MHz and 13.56 MHz) as Q increases, bandwidth decreases. In examples of data transfer at such frequencies, a lower Q may be preferred because it allows the system to have a larger bandwidth and, thus, allow for higher data rates. This may be in opposition to power transfer concerns, as a lower Q diminishes transfer efficiency, due to higher power losses in the antenna.

Accordingly, the wireless receiver system 130 may overcome the above mentioned conflict between higher Q for power transfer and lower Q for data transfer, as the first and second receiver antennas 131A, 131B may be designed having differing quality factors. To that end, the first receiver antenna 131A has a first quality factor and the second receiver antenna 131B has a second quality factor. In some such examples, the first quality factor is configured and/or optimized for receipt of, at least, electrical energy, via wireless power transfer. In some examples, the second quality factor is configured and/or optimized for receipt of electronic data signals, in the context of wireless communications. In such examples, the first quality factor is greater than the second quality factor. By utilizing the two receiver antennas 131A, 131B, the wireless receiver system 130 can be optimized to have greater efficiency for wireless power transfer, while maintaining and/or improving quality and speed for data communications.

In some examples, wherein the first quality factor for the first receiver antenna 131A and the second receiver antenna 131B are configured for and/or optimized for receipt of electrical energy signals and electronic data signals, respectively, the respective Q factors for each of the antennas 131A, 131B may be specifically configured to that end. Accordingly, in some such examples, the Q factor of the first antenna 131A may be within a range of about 5 to about 500. In some additional or alternative examples, the Q factor of the second antenna 131B may be within a range of about 5 to about 100.

Figure 8:
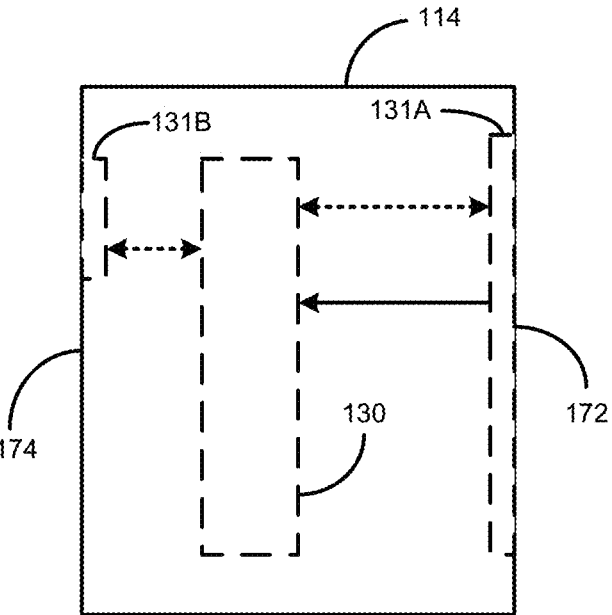
FIG. 8 is a side view of an exemplary host device, in which the wireless receiver system of FIG. 7 may be implemented, in accordance with FIGS. 1-7 and the present disclosure.

As illustrated in FIG. 8, the wireless receiver system 130 and the receiver antennas 131A, 131B may be operatively associated with an electronic host device 114. The electronic host device 130 may include and/or define a forward facing surface 174 and a rear facing surface 172, wherein the rear facing surface 172 may be substantially in an oppositional position to the forward facing surface 174. In some such examples, the first receiver antenna 131A may be positioned proximate to the rear facing surface 172 and the second receiver antenna 131B may be positioned proximate to the forward facing surface 174. Such an arrangement of the receiver antennas 131A, 131B may be advantageous in electronic host devices 114 wherein the data focused second receiver antenna 131B should be proximate to an environment facing front facing surface 174 for data transmission/receipt from another electronic device. For example, the electronic host device 114 may be an electronic smart watch, wherein the front facing surface 174 is the face and/or screen of the smart watch and the second receiver antenna 131B is utilized in external data communications, such as payment, data sharing, identification, among other contemplated data transfer tasks.

Figure 9:
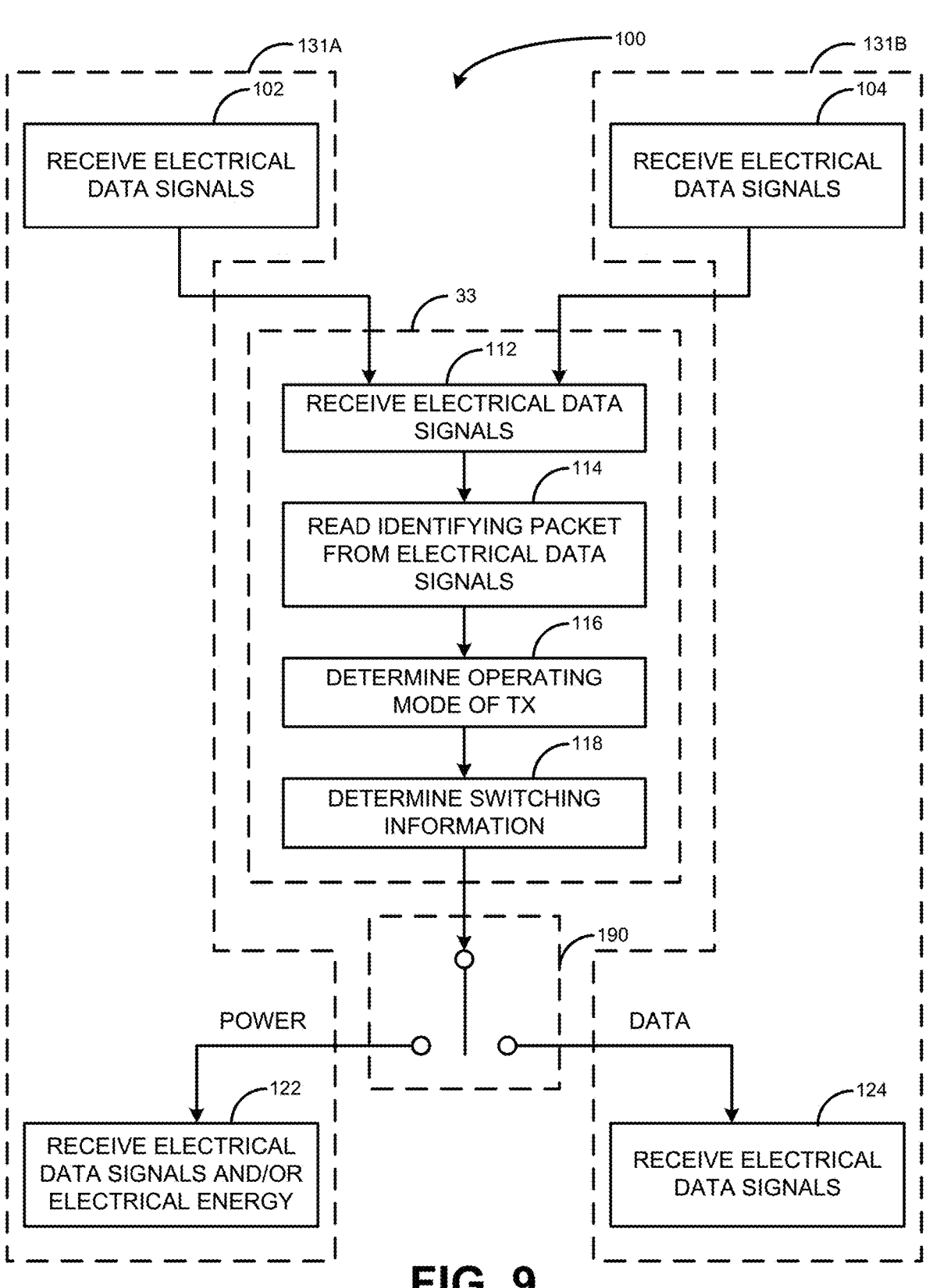
FIG. 9 is a flow chart for an exemplary method for receiving electrical data signals and electrical energy, in accordance with FIGS. 1-8 and the present disclosure.

Turning now to FIG. 9, a block diagram for method 100 for utilizing the wireless receiver system 130, for receiving electrical data signals and electrical energy, is illustrated. As illustrated, the labeled, dash-lined borders surrounding a plurality of blocks indicate which components of the wireless receiver system 130 perform said blocks (e.g., blocks 102 and 122 are performed by the first wireless receiver antenna 131A). Beginning at one or both of blocks 102, 104, the method 100 begins when one or both of the first and second wireless receiver antennas 131A, 131B receive electrical data signals. Then, as indicated at block 112, the receiver controller 38 receives the electrical data signals from one or both of the first and second receiver antennas 131A, 131B. Then, the receiver controller 38 may read the identifying type packet 191 from the electrical data signals, as discussed in more detail above, as described in block 114. At block 116, the method 100 includes determining the operating mode of the wireless transmission system 20, based, at least, on the operating mode information provided by the identifying type packet 191, as discussed in more detail above. Further, the receiver controller 38 determines switching instructions based, for example, on the operating mode information, as described at block 118. Then, based on the switching information, the receiver controller 38 controls the switch 190, to determine which antenna 131A, 131B is operable. Accordingly, if the switching information indicates that the wireless transmission system 20 is to transmit electrical energy as a power signal, then the switch 190 switches to receive electrical data signals and/or electrical energy from the first receiver antenna 131A, as illustrated in block 122. Alternatively, if the switching information indicates that the wireless transmission system 20 intends to send only electrical data signals, then the switch 190 switches to receive electrical data signals from the second wireless receiver antenna 131B, as illustrated in block 124.

The wireless receiver system 130 may be particularly useful in wireless power transfer systems wherein fidelity in communications and efficiency in power transfer are both optimized. By including two antennas 131A, 131B, each antenna can be optimized for its respective signal transfer characteristics, which may include tuning the quality factor to optimize for one or both of wireless power transfer and data communications.

Figure 10:
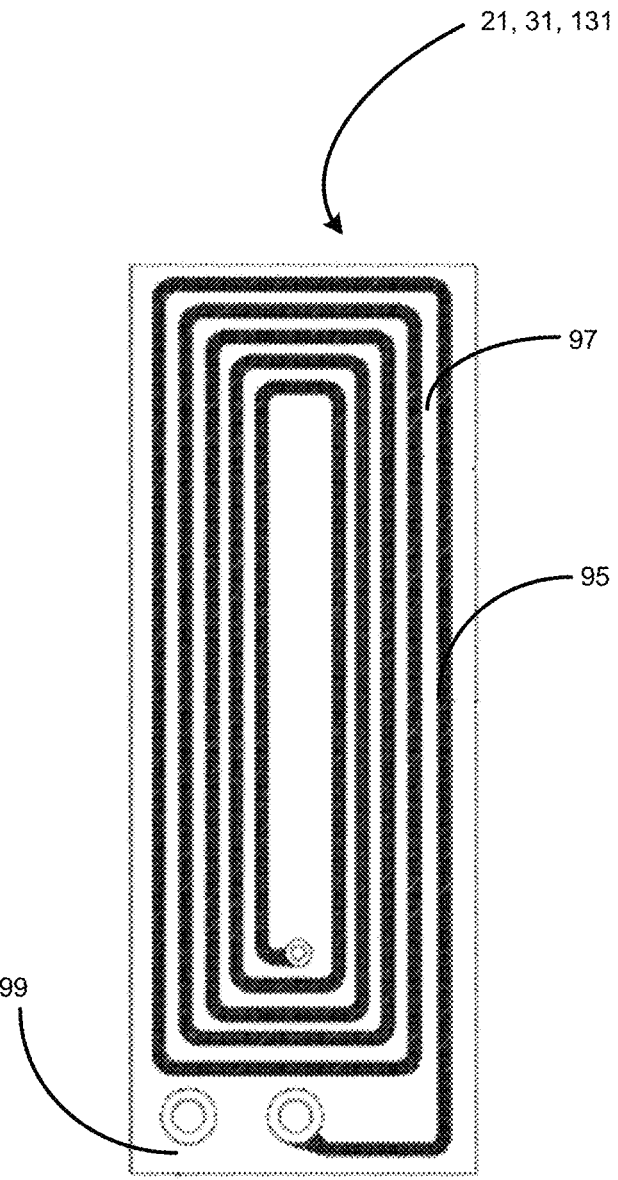
FIG. 10 is a top view of an exemplary antenna, for use as one or both of a transmission antenna and a receiver antenna of the system of FIG. 1 and/or any other systems, methods, or apparatus disclosed herein, in accordance with the present disclosure.

Turning now to FIG. 10, an exemplary, non-limiting embodiment of one or more of the transmission antenna 21, the receiver antenna 31, and/or the receiver antenna(s) 131 that may be used with any of the systems, methods, and/or apparatus disclosed herein. In the illustrated embodiment, the antenna 21, 31, 131, is a flat spiral coil configuration. In the exemplary embodiment shown, the antenna comprises four layers of alternating of an electrical conductor and electrically insulating layers integrated into a printed circuit board (PCB), flexible circuit board (FPC), or a hybrid circuit board (HCB), the HBC comprising a PCB portion and an FPC portion. As shown, the antenna 21, 31, 131 comprises two antenna segments that are electrically connected in series. As shown, the antenna 21, 31, 131 is constructed having five turns of a copper trace 95 deposited on the surface of an insulative substrate 99 with a gap 97 of, for example, 15 to 200 microns between each turn of the trace 95. Each segment comprises an electrical conductor (e.g., trace 95) positioned on an insulative substrate 98 in an electrical parallel configuration. Non-limiting examples can be found in U.S. Pat. Nos. 9,941,743, 9,960,628, 9,941,743 all to Peralta et al., U.S. Pat. Nos. 9,948,129, 10,063,100 to Singh et al., U.S. Pat. No. 9,941,590 to Luzinski, U.S. Pat. No. 9,960,629 to Rajagopalan et al. and U.S. Patent App. Nos. 2017/0040107, 2017/0040105, 2017/0040688 to Peralta et al., all of which are assigned to the assignee of the present application and incorporated fully herein by reference.

In addition, the antenna 21, 31, 131 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, 9,300,046, all to Singh et al., assigned to the assignee of the present application are incorporated fully herein. It is also noted that other antennas such as, but not limited to, an antenna configured to send and receive signals in the UHF radio wave frequency such IEEE standard 802.15.1 may be incorporated within the systems, methods, and/or apparatus of the present invention.

FIG. 11 is an example block diagram for a method 1000 for designing a system for wirelessly transferring one or more of electrical energy, electrical power, electromagnetic energy, and electronic data, in accordance with the systems, methods, and apparatus of the present disclosure. To that end, the method 1000 may be utilized to design a system in accordance with any disclosed embodiments of the systems 10 and any components thereof.

At block 1200, the method 1000 includes designing a wireless transmission system for use in the system 10. The wireless transmission system designed at block 1200 may be designed in accordance with one or more of the aforementioned and disclosed embodiments of the wireless transmission systems 20, in whole or in part and, optionally, including any components thereof. Block 1200 may be implemented as a method 1200 for designing a wireless transmission system.

Turning now to FIG. 12 and with continued reference to the method 1000 of FIG. 11, an example block diagram for the method 1200 for designing a wireless transmission system is illustrated. The wireless transmission system designed by the method 1000 may be designed in accordance with one or more of the aforementioned and disclosed embodiments of the wireless transmission systems 20 in whole or in part and, optionally, including any components thereof. The method 1200 includes designing and/or selecting a transmission antenna for the wireless transmission system, as illustrated in block 1210. The designed and/or selected transmission antenna may be designed and/or selected in accordance with one or more of the aforementioned and disclosed embodiments of the transmission antenna 21, in whole or in part and including any components thereof. The method 1200 includes designing and/or tuning a transmission tuning system for the wireless transmission system, as illustrated in block 1220. Such designing and/or tuning may be utilized for, but not limited to being utilized for, impedance matching, as discussed in more detail above. The designed and/or tuned transmission tuning system may be designed and/or tuned in accordance with one or more of the aforementioned and disclosed embodiments of wireless transmission systems 20 in whole or in part and, optionally, including any components thereof.

The method 1200 further includes designing a power conditioning system for the wireless transmission system, as illustrated in block 1230. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40, in whole or in part and, optionally, including any components thereof. Further, at block 1240, the method 1200 may determine and optimize a connection, and any associated connection components, to configure and/or optimize a connection between the input power source 12 and the power conditioning system of block 1230. Such determining, configuring, and/or optimizing may include selecting and implementing protection mechanisms and/or apparatus, selecting and/or implementing voltage protection mechanisms, among other things.

The method 1200 further includes designing and/or programing a transmission control system of the wireless transmission system of the method 1000, as illustrated in block 1250. The designed transmission control system may be designed in accordance with one or more of the aforementioned and disclosed embodiments of the transmission control system 26, in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 11, at block 1300, the method 1000 includes designing a wireless receiver system for use in the system 10. The wireless transmission system designed at block 1300 may be designed in accordance with one or more of the aforementioned and disclosed embodiments of the wireless receiver system 30, 130 in whole or in part and, optionally, including any components thereof. Block 1300 may be implemented as a method 1300 for designing a wireless receiver system.

Turning now to FIG. 12 and with continued reference to the method 1000 of FIG. 11, an example block diagram for the method 1300 for designing a wireless receiver system is illustrated. The wireless receiver system designed by the method 1300 may be designed in accordance with one or more of the aforementioned and disclosed embodiments of the wireless receiver system 30, 130 in whole or in part and, optionally, including any components thereof. The method 1300 includes designing and/or selecting a receiver antenna for the wireless receiver system, as illustrated in block 1310. The designed and/or selected receiver antenna may be designed and/or selected in accordance with one or more of the aforementioned and disclosed embodiments of the receiver antenna 31, 131 in whole or in part and including any components thereof. The method 1300 includes designing and/or tuning a receiver tuning system for the wireless receiver system, as illustrated in block 1320. Such designing and/or tuning may be utilized for, but not limited to being utilized for, impedance matching, as discussed in more detail above. The designed and/or tuned receiver tuning system may be designed and/or tuned in accordance with one or more of the aforementioned and disclosed embodiments of the receiver tuning system 34 in whole or in part and/or, optionally, including any components thereof.

The method 1300 further includes designing a power conditioning system for the wireless receiver system, as illustrated in block 1330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 1340, the method 1300 may determine and optimize a connection, and any associated connection components, to configure and/or optimize a connection between the load 16 and the power conditioning system of block 1330. Such determining, configuring, and/or optimizing may include selecting and implementing protection mechanisms and/or apparatus, selecting and/or implementing voltage protection mechanisms, among other things.

The method 1300 further includes designing and/or programing a receiver control system of the wireless receiver system of the method 1300, as illustrated in block 1350. The designed receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 1000 of FIG. 11, the method 1000 further includes, at block 1400, optimizing and/or tuning both the wireless transmission system and the wireless receiver system for wireless power transfer. Such optimizing and/or tuning includes, but is not limited to including, controlling and/or tuning parameters of devices to match impedance, optimize and/or configure voltage and/or power levels of an output power signal, among other things and in accordance with any of the disclosed systems, methods, and apparatus herein. Further, the method 1000 includes optimizing and/or tuning both the wireless transmission system and the wireless receiver system for data communications, in view of system characteristics necessary for wireless power transfer. Such optimizing and/or tuning includes, but is not limited to including, optimizing power characteristics for concurrent transmission of electrical energy and electrical data signals, tuning quality factors of antennas for different transmission schemes, among other things and in accordance with any of the disclosed systems, methods, and apparatus herein.

FIG. 14 is an example block diagram for a method 2000 for manufacturing a system for wirelessly transferring one or both of electrical energy and electronic data, in accordance with the systems, methods, and apparatus of the present disclosure. To that end, the method 2000 may be utilized to manufacture a system in accordance with any disclosed embodiments of the systems 10 and any components thereof.

At block 2200, the method 2000 includes manufacturing a wireless transmission system for use in the system 10. The wireless transmission system manufactured at block 2200 may be designed in accordance with one or more of the aforementioned and disclosed embodiments of the wireless transmission systems 20 in whole or in part and, optionally, including any components thereof. Block 2200 may be implemented as a method 2200 for manufacturing a wireless transmission system.

Turning now to FIG. 15 and with continued reference to the method 2000 of FIG. 14, an example block diagram for the method 2200 for manufacturing a wireless transmission system is illustrated. The wireless transmission system manufactured by the method 2000 may be manufactured in accordance with one or more of the aforementioned and disclosed embodiments of the wireless transmission systems 20 in whole or in part and, optionally, including any components thereof. The method 2200 includes manufacturing a transmission antenna for the wireless transmission system, as illustrated in block 2210. The manufactured transmission system may be built and/or tuned in accordance with one or more of the aforementioned and disclosed embodiments of the transmission antenna 21, in whole or in part and including any components thereof. The method 2200 includes building and/or tuning a transmission tuning system for the wireless transmission system, as illustrated in block 2220. Such designing and/or tuning may be utilized for, but not limited to being utilized for, impedance matching, as discussed in more detail above. The built and/or tuned transmission tuning system may be designed and/or tuned in accordance with one or more of the aforementioned and disclosed embodiments of the transmission tuning system 24, in whole or in part and, optionally, including any components thereof.

The method 2200 further includes selecting and/or connecting a power conditioning system for the wireless transmission system, as illustrated in block 2230. The power conditioning system manufactured may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40 in whole or in part and, optionally, including any components thereof. Further, at block 2240, the method 2200 may determine and optimize a connection, and any associated connection components, to configure and/or optimize a connection between the input power source 12 and the power conditioning system of block 2230. Such determining, configuring, and/or optimizing may include selecting and implementing protection mechanisms and/or apparatus, selecting and/or implementing voltage protection mechanisms, among other things.

The method 2200 further includes assembling and/or programing a transmission control system of the wireless transmission system of the method 2000, as illustrated in block 2250. The assembled transmission control system may be designed in accordance with one or more of the aforementioned and disclosed embodiments of the transmission control system 26 in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 14, at block 2300, the method 2000 includes manufacturing a wireless receiver system for use in the system 10. The wireless transmission system manufactured at block 2300 may be designed in accordance with one or more of the aforementioned and disclosed embodiments of the wireless receiver system 30, 130 in whole or in part and, optionally, including any components thereof. Block 2300 may be implemented as a method 2300 for manufacturing a wireless receiver system.

Turning now to FIG. 16 and with continued reference to the method 2000 of FIG. 14, an example block diagram for the method 2300 for manufacturing a wireless receiver system is illustrated. The wireless receiver system manufactured by the method 2000 may be designed in accordance with one or more of the aforementioned and disclosed embodiments of the wireless receiver system 30, 130 in whole or in part and, optionally, including any components thereof. The method 2300 includes manufacturing a receiver antenna for the wireless receiver system, as illustrated in block 2310. The manufactured receiver antenna may be manufactured, designed, and/or selected in accordance with one or more of the aforementioned and disclosed embodiments of the receiver antenna 31 in whole or in part and including any components thereof. The method 2300 includes building and/or tuning a receiver tuning system for the wireless receiver system, as illustrated in block 2320. Such building and/or tuning may be utilized for, but not limited to being utilized for, impedance matching, as discussed in more detail above. The built and/or tuned receiver tuning system may be designed and/or tuned in accordance with one or more of the aforementioned and disclosed embodiments of the receiver tuning system 34 in whole or in part and, optionally, including any components thereof.

The method 2300 further includes selecting and/or connecting a power conditioning system for the wireless receiver system, as illustrated in block 2330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 2340, the method 2300 may determine and optimize a connection, and any associated connection components, to configure and/or optimize a connection between the load 16 and the power conditioning system of block 2330. Such determining, configuring, and/or optimizing may include selecting and implementing protection mechanisms and/or apparatus, selecting and/or implementing voltage protection mechanisms, among other things.

The method 2300 further includes assembling and/or programing a receiver control system of the wireless receiver system of the method 2300, as illustrated in block 2350. The assembled receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 2000 of FIG. 14, the method 2000 further includes, at block 2400, optimizing and/or tuning both the wireless transmission system and the wireless receiver system for wireless power transfer. Such optimizing and/or tuning includes, but is not limited to including, controlling and/or tuning parameters of devices to match impedance, optimize and/or configure voltage and/or power levels of an output power signal, among other things and in accordance with any of the disclosed systems, methods, and apparatus herein. Further, the method 2000 includes optimizing and/or tuning both the wireless transmission system and the wireless receiver system for data communications, in view of system characteristics necessary for wireless power transfer, as illustrated at block 2500. Such optimizing and/or tuning includes, but is not limited to including, optimizing power characteristics for concurrent transmission of electrical energy and electrical data signals, tuning quality factors of antennas for different transmission schemes, among other things and in accordance with any of the disclosed systems, methods, and apparatus herein.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment the system may transmit electrical power on the order of about 100 µW to about 10 W. In another embodiment, electrical power up to around about 500 W may also be transmitted. Specifically considering near field magnetic coupling (NFMC) as the mechanism of wireless power transfer between the wireless transmission systems 20 and the wireless receiver systems 30, 130, it is well known that smaller sizes are generally more easily achievable if a higher operating frequency is selected. This is due to the inverse relationship of the required mutual inductance and the frequency of operation, as indicated by the following equation:

$$M = \frac{V_{induced}}{j * \omega * I_{Tx}}$$

where:
$V_{induced}$ is induced voltage on the receiver antenna coil
$I_{tx}$ is the AC current flowing through the transmitter antenna coil, and
$\omega$ is the operating frequency multiplied by $2\pi$.

Since the required mutual inductance increases in order to enable the wireless transfer of electrical energy having increased, it is necessary to increase the inductance or coupling of the transmitter or receiver while minimizing AC losses. Mutual inductance can be calculated by the following relationship:

$$M = k * \sqrt{L_{Tx} * L_{Rx}},$$

where:
M is the mutual inductance of the system,
k is the coupling of the system,
$L_{Tx}$ is the inductance of the transmitter antenna coil, and
$L_{Rx}$ is the inductance of the receiver antenna coil.

As the form factor of the antenna coil is reduced, attaining the required inductance on either the receiver or transmitter is accompanied by an increase in antenna coil resistance as the high number of turns required leads to a reduction in trace width. This increase in resistance typically reduces the quality factor of the antenna coil and overall coil to coil efficiency of the system where the Quality factor is defined as:

$$Q = \frac{\omega * L}{R},$$

where:
Q is the quality factor of the antenna coil,
L is the inductance of the antenna coil, $\omega$ is the operating frequency of the antenna coil in radians/second (alternatively, if the frequency of operation is in Hz, the operating frequency is $\omega$ divided by $2\pi$),
R is the equivalent series resistance (ESR) at the operating frequency.

Further, transmission (Tx) antenna coil to receiver (Rx) antenna coil efficiency (Eff) is defined by the following equation:

$$Eff = \frac{k^2 * Q_{Rx} * Q_{Tx}}{1 + \sqrt{1 + k^2 * Q_{Rx} * Q_{Tx}}},$$

where:
k is the coupling of the system,
$Q_{Rx}$ is the quality factor of the receiver antennal, and
$Q_{Tx}$ is the quality factor of the transmission antenna.

In an embodiment, a ferrite shield may be incorporated within the antenna structure to improve antenna performance. Selection of the ferrite shield material is dependent on the operating frequency as the complex magnetic permeability ($\mu = \mu' - j*\mu''$) is frequency dependent. The material may be a sintered flexible ferrite sheet, a rigid shield, or a hybrid shield, wherein the hybrid shield comprises a rigid portion and a flexible portion. Additionally, the ferrite shield may be composed of varying material compositions. Examples of materials may include, but are not limited to, zinc comprising ferrite materials such as manganese-zinc, nickel-zinc, copper-zinc, magnesium-zinc, and combinations thereof.

In addition, depending on the operating frequency and power requirements of the system 10, 110, a hybrid antenna construction comprising a Litz wire and a PCB coil combination may be desired to efficiently transfer power. In an embodiment, a hybrid Litz wire and PCB coil combination may comprise the transmission antenna 21 or the receiver antenna 31, 131 of a wrapped Litz wire construction and the other of the transmission antenna 21 or the receiver antenna 31, 131 may be constructed having a coil disposed on a surface of a circuit board such as the antenna shown in FIG. 17. Lower operating frequencies on the order of 100 kHz to several MHz range may require a certain mutual inductance between the transmission and receiver antenna 21, 31, 131. This is attainable by using a transmission antenna 21 of a Litz wire construction having a novel ferrite core in combination with a receiver antenna 31, 131 comprising a coil disposed on a surface of a circuit board, such as the antenna shown in FIG. 10.

In order to increase mutual inductance, the coupling and/or inductance of the transmission system 20 or the receiver system 30 must be increased. However, due to the small form factor constraints, coupling is limited by the physical size of the connector systems. It is noted that using transmitter and receiver antennas 21, 31, 131 of a construction comprising a coil disposed on the surface of a circuit board, such as the antenna shown in FIG. 10, may increase inductance and increase the resistance of the antenna coils thereby decreasing the quality factor Q and antenna to antenna efficiency.

In an embodiment, the system 10 comprising a transmitter system 20 having a transmission antenna 21 of a Litz-wire construction and a shielding material and a receiver system 30 having a receiver antenna 31 comprising a coil disposed on a surface of a circuit board (FIG. 10) may be used to increase the coupling and mutual inductance of an exemplary small form factor of the system 10. To achieve a higher antenna to antenna efficiency, this configuration may be used to achieve the necessary power transfer while maintaining high Q factor at lower frequencies. These improvements may also increase the overall performance of an exemplary system 10, 110 having a relatively small form factor.

The choice of coil design and construction is determined by a combination of the following electrical and magnetic parameters: inductance (L), equivalent series resistance (ESR) at the operating frequency, coupling (k), and Mutual inductance. For lower operating frequencies, i.e., from about 100 kHz to about 10 MHz, and for achieving increased power transmission on the order of about 0.1 mm to about 100 mm, this particular antenna topology is beneficial. For example, per the mutual inductance equations, if the power to be delivered to a load is constant, while the operating frequency decreases, the mutual inductance between the transmitter and receiver antenna coils increases at a constant transmit current. Table I illustrates the improvement in mutual inductance. Table II illustrates the improvement in coupling and Table III illustrates the improvement in antenna to antenna efficiency.

TABLE I

| Transmitter Antenna Construction | Transmitter Antenna Shield | Receiver Antenna Construction | M (µH) |
|---|---|---|---|
| Coil on FR4 PCB | Sheet | Coil on FR4 PCB | 0.35 |
| Litz Wire | T-Core | Coil on FR4 PCB | 1.35 |

TABLE II

| Transmitter Antenna Construction | Transmitter Antenna Shield | Receiver Antenna Construction | Coupling |
|---|---|---|---|
| Coil on FR4 PCB | Sheet | Coil on FR4 PCB | 0.26 |
| Litz Wire | T-Core | Coil on FR4 PCB | 0.29 |

TABLE III

| Transmitter Antenna Construction | Transmitter Antenna Shield | Receiver Antenna Construction | Antenna to Antenna Efficiency |
|---|---|---|---|
| Coil on FR4 PCB | Sheet | Coil on FR4 PCB | 57.9% |
| Litz Wire | T-Core | Coil on FR4 PCB | 80.8% |

In addition, if the system 10 is operated at a higher frequency, i.e., on the order of about 1 MHz or greater, the required mutual inductance will be reduced, thereby allowing for smaller transmitter and receiver antennas 21, 31, 131, wireless transmission systems 20 wireless receiver systems 30, 130. As defined herein shielding material is a material that captures a magnetic field. An example of which is a ferrite material. In the embodiments detailed in Tables I-III, a sheet of ferrite material is positioned directly adjacent to the transmitter antenna 21, for example, behind the transmitter antenna 21. As defined herein a "T-Core" shielding material is a magnetic field shield assembly comprising a sheet of shielding material, such as a ferrite material, placed directly behind the transmitter or receiver antenna 21, 31, 131 and an additional second shielding material, such as a ferrite material, placed within the inside area of a coil in the plane of the transmitter or receiver antenna 21, 31, 131. Furthermore, the wireless transmission system 20 or the wireless receiver system 30 may be constructed having the respective transmitter or receiver antennas 21, 31, 131 comprising a "C-core" shielding material in which the shielding material, such as a ferrite material, configured similarly to the letter "C", is positioned adjacent to the antenna 21, 31, 131. In addition, the wireless transmission system 20 or the wireless receiver system 30 may be constructed having the respective transmitter or receiver antennas 21, 31, 131 comprising a "E-core" shielding material in which the shielding material, such as a ferrite material, configured similarly to the letter "E", is positioned adjacent to the antenna 21, 31, 131.

Utilizing relatively small sized printed circuit board or flexible printed circuit board (PCB/FPC) based coil-antennas allow for appropriate stackups, appropriate trace widths, gap widths and copper (or other conductive material) depths that are more suitable for higher frequencies. Further, printed circuit board and flex printed circuit board-based, coil-antennas are highly integrated into the PCB fabrication process, thereby allowing for integration with the rest of the circuitry. This also allows for the integration of MLMT antenna designs to reduce ESR and improve the Q of the antennas.

Furthermore, utilizing coils in a layered approach allows for other fabrication processes, for example, printing, printing on fabrics, semiconductor fabrication processes, such as a low temperature co-fired ceramic (LTCC) process, a high temperature co-fired ceramic (HTCC) process, and the like.

Small form factor PCB coil designs are suitable at higher operating frequencies due to a lower required inductance while maintaining a low coil ESR to minimize the power dissipated in the transmit and receive coils. Printed circuit board (PCB) coil antennas offer additional benefits from a manufacturing, cost and assembly standpoint compared to wire-wound antenna coil solutions. For applications with a strict requirement for overall assembly thickness, printed circuit board (PCB) coil antennas are preferred due to the reduced thickness possible even with multilayer construction.

The ferrite shield material selected for the coil combination also depends on the operating frequency as the complex magnetic permeability ($\mu = \mu' - j*\mu''$) is frequency dependent. The material may be a sintered flexible ferrite sheet or a rigid shield and be composed of varying material compositions.

It is noted that the construction of the antenna 21, 31, 131 is non-limiting. The antenna that is incorporated within a system may comprise magnetic wires or have a stamped metal construction. Furthermore, the antenna 21, 31, 131 may utilize thick film, thin film or other printing fabrication technologies in its construction.

In an embodiment, incorporation of a transmitter or receiver antenna 21, 31, 131 having a multi-layer-multi-turn (MLMT) construction significantly reduces the equivalent series resistance (ESR) of the respective wireless transmission systems 20 and wireless receiver systems 30 and the wireless connector system 10 of the present invention. The inventors have discovered that incorporation of at least one transmitter and receiver antenna 21, 31, 131 having a multi-layer-multi-turn (MLMT) construction reduces equivalent series resistance (ESR) of the wireless transmission system 20 or wireless receiver system 30 by about 50 percent.

Furthermore, reducing ESR improves the overall system efficiency and reduces heating in the antenna 21, 31, 131 and the system 10 by reducing the ($I^2 \times R$) losses in the coil. Table IV shown below details the measured ESR for two multi-layer-multi-turn (MLMT) antenna designs in comparison to an antenna constructed comprising Litz wire wrapped around an inductor. As shown in Table IV below, the antenna constructed with an MLMT design exhibited a lower inductance, (0.60 µH) and a lower equivalent series resistance (ESR) (0.5052) in comparison to the antenna having a traditional wound Litz wire construction. Thus, the transmitter or receiver antenna 21, 31, 131 having a multi-layer-multi-turn (MLMT) construction contributes to the increased electrical performance of increased electrical power transmission and increased system separation distance of the gap 17 of the system 10 of the present invention.

TABLE III

| Antenna Design | Frequency (MHz) | Inductance (µH) | ESR (Ω) |
| --- | --- | --- | --- |
| Litz Wire | 2 | 3.80 | 0.97 |
| MLMT | 2 | 0.60 | 0.50 |
| MLMT | 10 | 0.65 | 1.05 |

Exemplary ways of connecting the system to a host device include, but are not limited to, directly soldering or placing the at least one wireless transmission system 20 and wireless receiver systems 30 on a circuit board or a host device 11, 14. Alternatively, the at least one wireless transmission system 20 and wireless receiver systems 30, 130 could be connected to a circuit board or a host device using a wire/cable. Once connected to a host device the full structure or at least a portion of the structure of the at least one wireless transmission system 20 and wireless receiver systems 30, 130 may be encapsulated within an insulative coating.

In another embodiment, the system 10 of the present application could include a system that can operate both as a transmitter and as a receiver, (e.g., a transceiver). In a further embodiment, the system 10 of the present application may comprise a power and data transfer system in addition to a single antenna where the data is modulated into the power frequency.

In another embodiment, the system 10 of the present invention may comprise multiple antennas within each wireless transmission system 20 and wireless receiver systems 30, 130. If a multiple antenna system is employed, then the first antenna could be reserved for identification, diagnostics and any uni- or bi-directional data transfer, while the second antenna can be dedicated to power transfer.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:

1. A wireless receiver system operatively associated with a wearable electronic device and configured to receive electrical data signals and electrical energy, the wireless receiver system comprising:

a first receiver antenna configured to receive one or both of the electrical data signals and the electrical energy;

a second receiver antenna spaced apart from the first receiver antenna, the second receiver antenna configured to receive the electrical data signals;

a switch configured to switch receiving operations between the first receiver antenna and the second receiver antenna based, at least in part, on switching instructions; and a controller comprising:

at least one processor;

at least one machine-readable medium; and program instructions stored on the at least one machine-readable medium which, when executed by the at least one processor, cause the controller to:

monitor receipt of the electrical data signals, from a wireless transmission system, by one of the first receiver antenna, the second receiver antenna, or combinations thereof;

determine switching instructions that enable wireless power transfer via the first receiver antenna, the switching instructions based, at least in part, on the electrical data signals; and based on determining that the switching instructions enable wireless power transfer via the first receiver antenna, provide the switching instructions to the switch; and wherein the electrical data signals comprise at least one of data sharing, identification information, payment information or combinations thereof.

2. The wireless receiver system of claim 1, wherein one or both of the first receiver antenna and the second receiver antenna operate at an operating frequency of about 13.56 megahertz (MHz).

3. The wireless receiver system of claim 1, wherein the controller further comprises program instructions stored on the at least one machine-readable medium which, when executed by the at least one processor, cause the controller to:

determine switching instructions that enable the second receiver antenna to receive the electrical data signals, the switching instructions based, at least in part, on the electrical data signals; and based on determining that the switching instructions enable the second receiver antenna to receive the electrical data signals, provide the switching instructions to the switch.

4. The wireless receiver system of claim 3, wherein the switching instructions are based, at least in part, on an identifying data packet of the electrical data signals, and wherein the identifying data packet indicates if a wireless transmission system, from which the electrical data signals are transmitted, intends to transmit one or both of the electrical data signals and the electrical energy.

5. The wireless receiver system of claim 4, wherein if the identifying data packet indicates that the wireless transmission system intends to transmit the electrical energy, then the switching instructions instruct the switch to make the first receiver antenna operable.

6. The wireless receiver system of claim 1, wherein the first receiver antenna has a first quality factor, and wherein the second receiver antenna has a second quality factor.

7. The wireless receiver system of claim 6, wherein the first quality factor is configured for receipt of electrical energy.

8. The wireless receiver system of claim 7, wherein the first quality factor is in a range from about 5 to about 500.

9. The wireless receiver system of claim 6, wherein the first quality factor is greater than the second quality factor.

10. The wireless receiver system of claim 3, wherein the switch is a single pole, double throw (SPDT) switch.

11. The wireless receiver system of claim 1, wherein the first receiver antenna is positioned proximate to a rear facing surface, and wherein the second receiver antenna is positioned proximate to a forward-facing surface.

12. The wireless receiver system of claim 11, wherein the wearable electronic device is an electronic smart watch, wherein the forward-facing surface is a front facing surface of the electronic smart watch, and wherein the rear facing surface is a rear facing surface of the electronic smart watch.

13. The wireless receiver system of claim 12, wherein one or both of the first receiver antenna and the second receiver antenna operate at an operating frequency of about 13.56 megahertz (MHz).

14. A wireless connection system for a wearable electronic device comprising:

a wireless transmission system configured to transmit electrical data signals and electrical energy to the wearable electronic device;

a wireless receiver system positioned within the wearable electronic device, the wireless receiver system comprising:

a first receiver antenna configured to receive one or both of the electrical data signals and the electrical energy;

a second receiver antenna spaced apart from the first receiver antenna, wherein the second receiver antenna is configured to receive the electrical data signals;

a switch configured to switch receiving operations between the first receiver antenna and the second receiver antenna based, at least in part, on switching instructions; and a controller comprising:

at least one processor;

at least one machine-readable medium; and program instructions stored on the at least one machine-readable medium which, when executed by the at least one processor, cause the controller to:

monitor receipt of the electrical data signals, from a wireless transmission system, by one of the first receiver antenna, the second receiver antenna, or combinations thereof;

determine switching instructions that enable wireless power transfer via the first receiver antenna, the switching instructions based, at least in part, on the electrical data signals; and based on determining that the switching instructions enable wireless power transfer via the first receiver antenna, provide the switching instructions to the switch; and wherein the electrical data signals comprise at least one of data sharing, identification information, payment information or combinations thereof.

15. The wireless connection system of claim 14, wherein one or both of the first receiver antenna and the second receiver antenna operate at an operating frequency of about 13.56 megahertz (MHz).

16. The wireless connection system of claim 14, wherein the wireless transmission system includes a transmission controller configured to generate the electrical data signals, the electrical data signals including a data packet, the data packet including operating mode information, and wherein the controller of the wireless receiver system further comprises program instructions stored on the at least one machine-readable medium which, when executed by the at least one processor, cause the controller to:

determine switching instructions based, at least in part, on the operating mode information included in the data packets of the electrical data signals.

17. The wireless connection system of claim 16, wherein the operating mode information indicates if the wireless transmission system, from which the electrical data signals are transmitted, intends to transmit one or both of the electrical data signals and the electrical energy.

18. The wireless connection system of claim 14, wherein the wireless transmission system includes a transmission antenna configured to:

transmit one or both of the electrical data signals and electrical energy to the first receiver antenna; and transmit the electrical data signals to the second receiver antenna.

19. The wireless connection system of claim 14, wherein the first receiver antenna has a first quality factor, and wherein the second receiver antenna has a second quality factor.

20. The wireless connection system of claim 19, wherein the first quality factor is configured for receipt of electrical energy, and wherein the first quality factor is greater than the second quality factor.

* * * * *